US012579260B2

(12) United States Patent
 Kim

(10) Patent No.: US 12,579,260 B2
(45) Date of Patent: *Mar. 17, 2026

(54) EMAIL SECURITY SYSTEM AND OPERATION METHOD THEREOF FOR BLOCKING AND RESPONDING TO TARGETED EMAIL ATTACKS, WHICH PERFORM INSPECTION OF UNAUTHORIZED EMAIL SERVER ACCESS ATTACK

(71) Applicant: KIWONTECH CO., LTD., Seoul (KR)

(72) Inventor: Chung Han Kim, Seoul (KR)

(73) Assignee: KIWONTECH CO., LTD., Seoul (KR)

( * ) Notice: Subject to any disclaimer, the term of this patent is extended or adjusted under 35 U.S.C. 154(b) by 29 days.

This patent is subject to a terminal disclaimer.

(21) Appl. No.: 18/571,705

(22) PCT Filed: Jul. 19, 2023

(86) PCT No.: PCT/KR2023/010364
 § 371 (c)(1),
 (2) Date: Dec. 18, 2023

(87) PCT Pub. No.: WO2024/029796
 PCT Pub. Date: Feb. 8, 2024

(65) Prior Publication Data
 US 2025/0086275 A1     Mar. 13, 2025

(30) Foreign Application Priority Data

Aug. 4, 2022     (KR) ........................ 10-2022-0097174
Nov. 14, 2022     (KR) ........................ 10-2022-0151267
(Continued)

(51) Int. Cl.
 *G06F 21/55*     (2013.01)

(52) U.S. Cl.
 CPC ...... *G06F 21/554* (2013.01); *G06F 2221/034* (2013.01)

(58) Field of Classification Search
 CPC ........................ G06F 21/554; G06F 2221/034
 (Continued)

(56) References Cited

U.S. PATENT DOCUMENTS 6,550,012 B1 * 4/2003 Villa ................... H04L 63/0263
                                                                     713/168
7,603,472 B2 * 10/2009 Petry ................... G06Q 20/105
                                                                     709/224
(Continued)

FOREIGN PATENT DOCUMENTS

KR          10-1117866 B1      3/2012
KR          10-1533506 B1      7/2015
 (Continued)

OTHER PUBLICATIONS

International Search Report & Written Opinion for PCT/KR2023/010364 by Korean Intellectual Property Office dated Oct. 26, 2023.
 (Continued)

*Primary Examiner* — Taghi T Arani
(74) *Attorney, Agent, or Firm* — BROADVIEW IP LAW, PC

(57)     ABSTRACT

The present invention relates to an email security system and an operation method thereof for blocking and responding to targeted email attacks, which perform inspection of unauthorized email server access attack, and the method comprises the steps of: configuring security threat information synchronization data by synchronizing targeted email security threat information configured by performing a targeted email security threat inspection on an inbound mail with targeted email security threat information configured by performing a targeted email security threat inspection on an
 (Continued)

outbound mail; performing a targeted email security threat inspection corresponding to a new inbound mail or a new outbound mail using the security threat information synchronization data; and performing a targeted email security threat response process according to the targeted email security threat inspection of the new inbound mail or the new outbound mail.

11 Claims, 8 Drawing Sheets

(30)         Foreign Application Priority Data

| Nov. 14, 2022 | (KR) | .......................... 10-2022-0151268 |
| Dec. 2, 2022 | (KR) | .......................... 10-2022-0166583 |
| Jul. 18, 2023 | (KR) | .......................... 10-2023-0092845 |

(58) Field of Classification Search
USPC ........................................................... 726/23
See application file for complete search history.

(56)         References Cited

U.S. PATENT DOCUMENTS

| 7,831,672 | B2 * | 11/2010 | Tsai | ...................... G06F 21/554 |
| | | | | 709/224 |
| 10,243,989 | B1 * | 3/2019 | Ding | ...................... H04L 63/145 |
| 10,397,272 | B1 * | 8/2019 | Bruss | ........................ G06N 7/01 |
| 11,044,267 | B2 * | 6/2021 | Jakobsson | ............. H04L 51/212 |
| 11,392,691 | B1 * | 7/2022 | Wright | .................. H04L 63/145 |
| 2002/0199095 | A1 * | 12/2002 | Bandini | .............. H04L 63/0245 |
| | | | | 713/151 |
| 2005/0204012 | A1 * | 9/2005 | Campbell | ............ G06Q 10/107 |
| | | | | 709/206 |
| 2006/0267802 | A1 * | 11/2006 | Judge | .................. H04L 63/1408 |
| | | | | 455/414.2 |
| 2007/0033258 | A1 * | 2/2007 | Vasilaky | .............. G06Q 10/107 |
| | | | | 709/206 |
| 2007/0061266 | A1 * | 3/2007 | Moore | ................... G06Q 50/00 |
| | | | | 705/51 |
| 2009/0089877 | A1 * | 4/2009 | Bolinger | ................. H04L 51/48 |
| | | | | 709/206 |
| 2010/0161748 | A1 | 6/2010 | Hazeur et al. | |
| 2013/0104251 | A1 * | 4/2013 | Moore | .................. G06F 21/602 |
| | | | | 726/30 |
| 2016/0182451 | A1 * | 6/2016 | Nandagopal | ........ H04L 63/1441 |
| | | | | 726/11 |
| 2018/0145986 | A1 * | 5/2018 | Chien | ................... H04L 63/101 |
| 2020/0053111 | A1 * | 2/2020 | Jakobsson | ........... H04L 63/1416 |
| 2020/0204572 | A1 * | 6/2020 | Jeyakumar | ............ G06F 21/561 |
| 2020/0396190 | A1 * | 12/2020 | Pickman | ............... H04L 67/306 |
| 2021/0329007 | A1 * | 10/2021 | Pearce | ................... H04L 51/23 |

FOREIGN PATENT DOCUMENTS

| KR | 10-1600864 | B1 | 3/2016 |
| KR | 10-1605764 | B1 | 3/2016 |
| KR | 10-2021-0017986 | A | 2/2021 |
| KR | 10-2232206 | B1 | 3/2021 |
| KR | 10-2247617 | B1 | 5/2021 |
| KR | 10-2022-0089459 | A | 6/2022 |
| KR | 10-2022-0098316 | A | 7/2022 |

OTHER PUBLICATIONS

Office Action for KR 10-2022-0151268 by Korean Intellectual Property Office dated Dec. 14, 2023.
Office Action for JP 2023-578183 by Japan Patent Office dated Sep. 17, 2024.
Office Action for U.S. Appl. No. 18/571,702 by United States Patent and Trademark Office dated Jun. 10, 2025.
International Search Report & Written Opinion for PCT/KR2022/019497 by Korean Intellectual Property Office dated Apr. 24, 2023.

\* cited by examiner

100

110

120 — Inspection data collection unit

130 — Targeted email security threat inspection unit

140 — Security threat information synchronization processing unit

150 — Inbound mail processing unit

Control unit

160 — Outbound mail processing unit

Record management unit — 170
Learning data processing unit — 171

180 — Diagnosis reporting unit

125 — Communication unit

FIG. 3

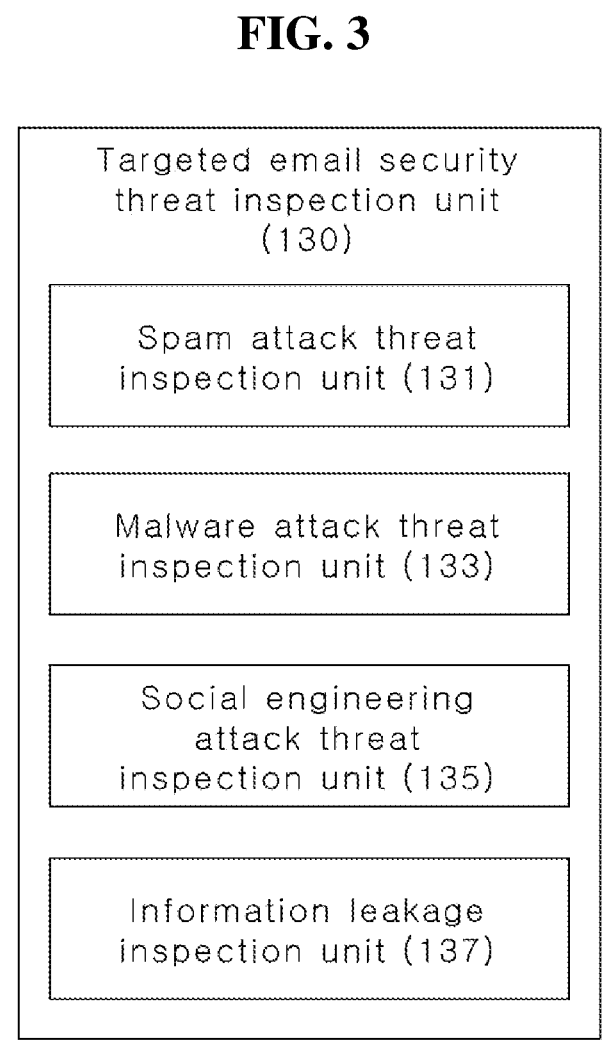

Targeted email security
threat inspection unit
(130)

Spam attack threat
inspection unit (131)

Malware attack threat
inspection unit (133)

Social engineering
attack threat
inspection unit (135)

Information leakage
inspection unit (137)

EMAIL SECURITY SYSTEM AND OPERATION METHOD THEREOF FOR BLOCKING AND RESPONDING TO TARGETED EMAIL ATTACKS, WHICH PERFORM INSPECTION OF UNAUTHORIZED EMAIL SERVER ACCESS ATTACK

CROSS-REFERENCE TO RELATED APPLICATIONS

This application is a National Phase Entry Application of PCT Application No. PCT/KR2023/010364, filed on Jul. 19, 2023, which claims priority to Korean Patent Application No. 10-2022-0097174, filed on Aug. 4, 2022, which claims priority to Korean Patent Application No. 10-2022-0151267, filed on Nov. 14, 2022, which claims priority to Korean Patent Application No. 10-2022-0151268, filed on Nov. 14, 2022, which claims priority to Korean Patent Application No. 10-2022-0166583, filed on Dec. 2, 2022, which claims priority to Korean Patent Application No. 10-2023-0092845, filed on Jul. 18, 2023, in Korean Intellectual Property Office, the entire contents of which are hereby incorporated by reference in its entirety.

TECHNICAL FIELD

The present invention relates to an email security system for blocking and responding to targeted email attacks, and an operation method thereof.

BACKGROUND ART

With the development of network attack technologies, cyber-attacks through email are gradually evolving in modern society. As the activities of malicious emails aiming at specific targets, i.e., so-called targeted email attacks, increase through complicated cyber-attack strategies using malware and social engineering, active Internet users and companies around the world are suffering from damage.

Unlike spam phishing attacks targeting an unspecified number of people, these targeted email attacks include attacks set targeting an individual or a company and damaging information assets of a specific person.

To carry out the targeted email attacks, a threat actor collects information and creates a personalized email message that looks real to persuade the target to respond, and ultimately creates security holes.

Furthermore, since the targeted attacks used for incoming (inbound) and outgoing (outbound) emails make use of sophisticated and unknown methods, such as attaching unknown intelligent malware or impersonating a legitimate sender trusted by the target, using forgery or alteration of header, look-alike email address, account takeover (ATO), or the like, victims respond to the emails by clicking an attached file intended by the attacker to send money incorrectly, leak data, or generate computer system failure, or by sending a reply mail including personal information.

This may invite a serious risk to the victim's information assets. However, compared to the severity of these targeted email attacks, the email security solutions proposed to date only stay in fragmentary technologies such as simply blocking inbound spam mails, blocking inbound domains, and the like, and solutions that effectively prevent or block the targeted email attacks by comprehensively utilizing known technologies have not been proposed yet.

Particularly, since the targeted email attacks on the incoming (inbound) side ultimately lead to a security problem for outgoing (outbound) emails, and the outbound security problems also lead to inbound security problems, a systematic security system comprehensively considering these problems is required to block the targeted email attacks, but an appropriate solution has not been proposed yet.

DISCLOSURE OF INVENTION

Technical Problem

Therefore, the present invention has been made in view of the above problems, and it is an object of the present invention to provide an email security system device for effectively blocking and responding to targeted email attacks and an operation method thereof, which can effectively block the targeted email attacks and provide an appropriate response process and diagnosis reporting through a stepwise targeted email attack threat inspection process for inbound and outbound mails.

Technical Solution

To accomplish the above object, according to one aspect of the present invention, there is provided an operation method of a service providing device using an email security system, the method comprising the steps of: configuring security threat information synchronization data by synchronizing targeted email security threat information configured by performing a targeted email security threat inspection on an inbound mail with targeted email security threat information configured by performing a targeted email security threat inspection on an outbound mail; performing a targeted email security threat inspection corresponding to a new inbound mail or a new outbound mail using the security threat information synchronization data; and performing a targeted email security threat response process according to the targeted email security threat inspection of the new inbound mail or the new outbound mail, wherein the targeted email security threat inspection includes an unauthorized email server access attack threat inspection corresponding to email information leakage threat inspection items.

According to another aspect of the present invention, there is provided a service providing device using an email security system, the device comprising: a security threat information synchronization processing unit for configuring security threat information synchronization data by synchronizing targeted email security threat information configured by performing a targeted email security threat inspection on an inbound mail with targeted email security threat information configured by performing a targeted email security threat inspection on an outbound mail; a targeted email security threat inspection unit for performing a targeted email security threat inspection corresponding to a new inbound mail or a new outbound mail using the security threat information synchronization data; and a mail processing unit for performing a targeted email security threat response process according to the targeted email security threat inspection of the new inbound mail or the new outbound mail, wherein the targeted email security threat inspection unit performs an unauthorized email server access attack threat inspection corresponding to email information leakage threat inspection items.

Meanwhile, the method according to an embodiment of the present invention for solving the problems described above may be implemented in a program for executing the method on a computer and a computer-readable recording medium in which the program is stored.

Advantageous Effects

According to the present invention, as security threat information synchronization data is configured by synchronizing the targeted email security threat information configured by performing a targeted email security threat inspection on an inbound mail with the targeted email security threat information configured by performing a targeted email security threat inspection on an outbound mail, and a targeted email security threat inspection corresponding to a new inbound or outbound mail is performed in steps using the security threat information synchronization data, an effective targeted email attack threat inspection process can be performed.

Accordingly, the present invention may provide an email security system device for effectively blocking and responding to targeted email attacks and an operation method thereof, which can effectively block the targeted email attacks and provide diagnosis reporting and an appropriate response process through a stepwise targeted email attack threat inspection process for inbound and outbound mails.

BRIEF DESCRIPTION OF THE DRAWINGS

FIGS. 3 and 4 are block diagrams for explaining in more detail some configurations of the service providing device according to an embodiment of the present invention.

BEST MODE FOR CARRYING OUT THE INVENTION

Figure 1:
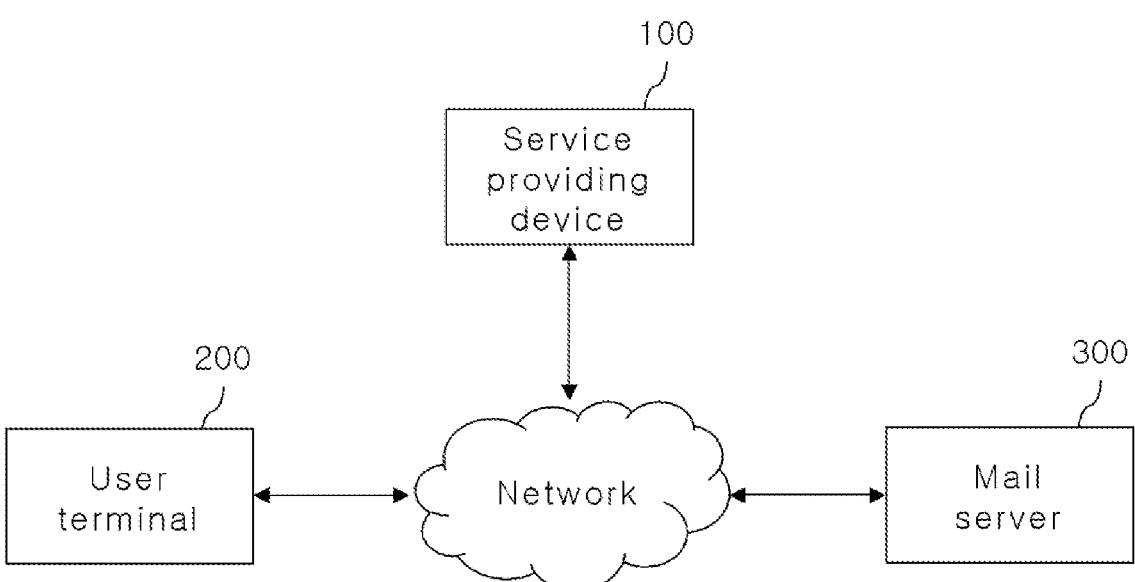
FIG. 1 is a conceptual view schematically showing the entire system according to an embodiment of the present invention.

Hereinafter, only the principles of the present invention will be exemplified. Therefore, although not clearly described or shown in this specification, those skilled in the art will be able to implement the principles of the present invention and invent various devices included in the spirit and scope of the present invention. In addition, it should be understood that all conditional terms and embodiments listed in this specification are, in principle, clearly intended only for the purpose of understanding the concept of present invention, and not limited to the embodiments and states specially listed as such.

In addition, it should be understood that all detailed descriptions listing specific embodiments, as well as the principles, aspects, and embodiments of the present invention, are intended to include structural and functional equivalents of such matters. In addition, it should be understood that such equivalents include equivalents that will be developed in the future, as well as currently known equivalents, i.e., all devices invented to perform the same function regardless of the structure.

Accordingly, for example, the block diagrams in the specification should be understood as expressing the conceptual viewpoints of illustrative circuits that embody the principles of the present invention. Similarly, all flowcharts, state transition diagrams, pseudo code, and the like may be practically embodied on computer-readable media, and it should be understood that regardless of whether or not a computer or processor is explicitly shown, they show various processes performed by the computer or processor.

In addition, explicit use of the terms presented as processors, controls, or concepts similar thereto should not be interpreted by exclusively quoting hardware having an ability of executing software, and should be understood to implicitly include, without limitation, digital signal processor (DSP) hardware, and ROM, RAM and non-volatile memory for storing software. Other known common hardware may also be included.

The above objects, features and advantages will become more apparent through the following detailed description related to the accompanying drawings, and accordingly, those skilled in the art may easily implement the technical spirit of the present invention. In addition, when it is determined in describing the present invention that the detailed description of a known technique related to the present invention may unnecessarily obscure the gist of the present invention, the detailed description thereof will be omitted.

The terms used in this specification are used only to describe specific embodiments, and are not intended to limit the present invention. Singular expressions include plural expressions unless the context clearly dictates otherwise. It should be understood that in this specification, terms such as "comprise" or "have" are intended to specify existence of a feature, a number, a step, an operation, a component, a part, or a combination thereof described in the specification, not to preclude the possibility of existence or addition of one or more other features, numbers, steps, operations, components, parts, or combinations thereof.

Hereinafter, preferred embodiments of the present invention will be described in more detail with reference to the accompanying drawings. In describing the present invention, in order to facilitate the overall understanding, the same reference numerals are used for the same components in the drawings, and duplicate descriptions of the same components are omitted.

A 'mail (email)' used in this specification may collectively refer to terms such as electronic mail, web email, electronic mail, electronic mail materials, and the like exchanged between a user and a terminal device using a computer communication network through a client program installed in the terminal device or a website.

FIG. 1 is a conceptual view showing the entire system according to an embodiment of the present invention.

Referring to FIG. 1, a system according to an embodiment of the present invention includes a service providing device 100, a user terminal 200, and a mail server 300.

More specifically, the service providing device 100, the user terminal 200, and the mail server 300 are connected to a public network in a wired or wireless manner to transmit and receive data. The public network is a communication network constructed and managed by the country or a telecommunication infrastructure operator, and generally includes a telephone network, a data network, a CATV network, a mobile communication network, and the like, and provides connection services so that unspecified many people may access other communication networks or the Internet. In the present invention, the public network is described as a network.

In addition, the service providing device 100, the user terminal 200, and the mail server 300 may include a communication module for communicating using a protocol corresponding to each communication network.

The service providing device 100 may be connected to each user terminal 200 and the mail server 300 through a wired/wireless network to provide a mail security and diagnosis service, and devices or terminals connected to each network may communicate with each other through a preset network channel.

Here, each of the networks may be implemented as any one type of wired/wireless networks, such as a local area network (LAN), a wide area network (WAN), a value-added network (VAN), a personal area network (PAN), a mobile communication network, or a satellite communication network.

The service providing device 100 described in this specification may provide a mail security service capable of detecting and blocking unintended execution of a program through a mail and attacks that lead to lowered data processing power, phishing scam, and the like of mail-related systems.

Furthermore, as the service providing device 100 configures security threat information synchronization data by synchronizing the targeted email security threat information configured by performing a targeted email security threat inspection on an inbound mail with the targeted email security threat information configured by performing a targeted email security threat inspection on an outbound mail, and performs a targeted email security threat inspection corresponding to a new inbound mail or a new outbound mail in steps using the security threat information synchronization data, the service providing device 100 may provide a mail security service that performs a targeted email security threat response process according to the targeted email security threat inspection of the new inbound mail or the new outbound mail.

Here, the targeted email security threat inspection corresponding to the new inbound mail or the new outbound mail may include at least one among a spam attack threat inspection targeting a specific email account using the security threat information synchronization data, a malware email attack threat inspection, a social engineering email attack threat inspection, and an email information leakage threat inspection, and a targeted email inspection is processed according to a step-by-step inspection process predefined in correspondence to a security level, and the processed inspection data may be used to update the security threat information synchronization data.

In addition, the service providing device 100 may provide a mail diagnosis service of performing a mail diagnosis process based on quantitative analysis of mail security threat elements corresponding to targeted email attacks, and providing a diagnosis report based on the diagnosis process to each email system user terminal 200, using the security threat information synchronization data and targeted email inspection processing information.

In addition, although the user terminal 200 described in this specification may include a personal computer (PC), a laptop computer, a mobile phone, a tablet PC, a Personal Digital Assistant (PDA), a Portable Multimedia Player (PMP), and the like, the present invention is not limited thereto, and the user terminal may be a device that can be connected to the service providing device 100 and the mail server 300 through a public network or a private network.

In addition, each device may be a device of various types capable of inputting and outputting information by driving an application or browsing the web. Particularly, it is general that user terminals 200 may be connected to the service providing device 100 through an individual security network.

Meanwhile, the mail server 300 is a system that relays and stores electronic mail contents so that a user may send a mail written through the user terminal 200 or receive a mail written by a counterpart through the user terminal 200. The mail server 300 may communicate using a preset protocol according to the purpose of receiving and sending mails.

Generally, Post Office Protocol 3 (POP3) and Internet Message Access Protocol (IMAP) may be used as the protocol when a mail is received. In addition, Simple Mail Transfer Protocol (SMTP) may be used as the protocol when sending a mail. In this way, the mail server 300 may be configured to operate as a server system for processing mail transmission and reception. In addition, the mail server 300 may be subdivided into a mail receiving server and a mail sending server to provide their functions.

Figure 2:
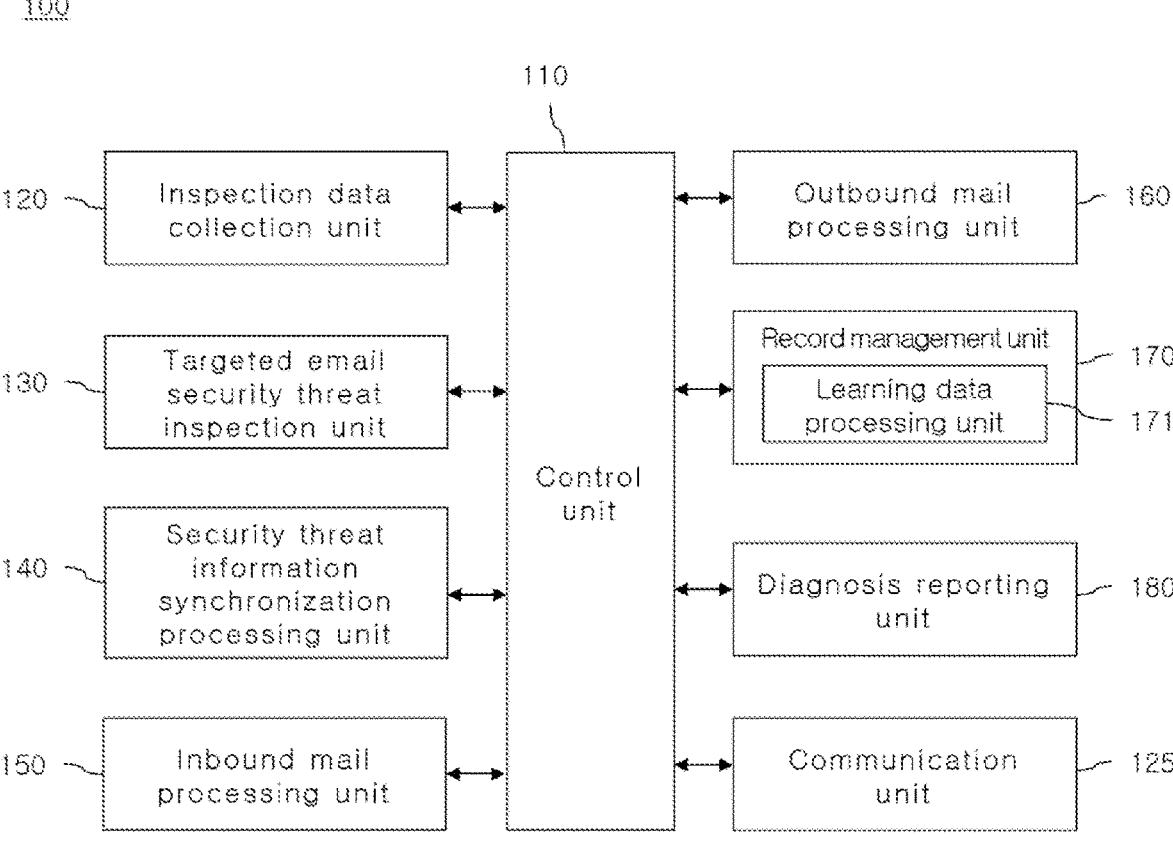
FIG. 2 is a block diagram for explaining a service providing device according to an embodiment of the present invention.
Figure 4:
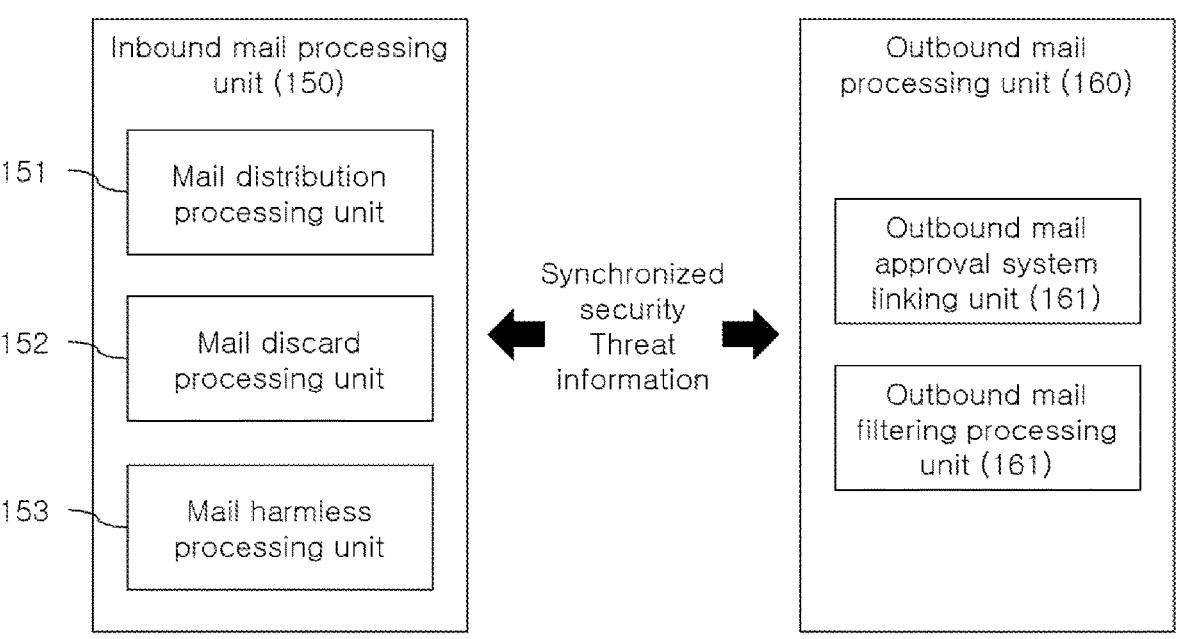

FIG. 2 is a block diagram for explaining a service providing device according to an embodiment of the present invention, and FIGS. 3 and 4 are block diagrams for explaining in more detail some configurations of the service providing device according to an embodiment of the present invention.

First, referring to FIG. 2, the service providing device 100 according to an embodiment of the present invention includes a control unit 110, an inspection data collection unit 120, a targeted email security threat inspection unit 130, a security threat information synchronization processing unit 140, an inbound mail processing unit 150, an outbound mail processing unit 160, a record management unit 170, a diagnosis reporting unit 180, and a communication unit 125.

The control unit 110 may be implemented as one or more hardware processors for overall control of the operation of each component in the service providing device 100.

The communication unit 125 may include one or more communication modules for communicating with a network in which the user terminal 200 or the mail server 300 is located.

The inspection data collection unit 120 may collect mail information transmitted and received between one or more user terminals 200 through the mail server 300. The mail information may include email header information, an email subject, an email message body, the number of times of receiving emails during a predetermined period, and the like.

Specifically, the email header information may include the IP address of the mail sending server, information on the host name of the mail sending server, information on the mail domain of the sender, the mail address of the sender, the IP address of the mail receiving server, information on the host name of the mail receiving server, information on the mail domain of the receiver, the mail address of the receiver, information on the mail protocol, information on the time of receiving the mail, information on the time of sending the mail, and the like.

In addition, the email header may include network path information required in the process of sending and receiving mail, information on the protocol used between mail service systems for exchanging mail, and the like.

In addition, the mail information may include an extension of an attached file, hash information of the attached file, a name of the attached file, a contents body of the attached file, uniform resource locator (URL) information, and the like. The attached file may include additional contents for transferring additional information or requesting reply of information, in addition to the message body of the mail that the sender desires to transfer to the receiver.

The contents may provide text, images, videos, and the like. The receiver may confirm the contents by executing an application corresponding to the file attached to the mail. In addition, the receiver may download the file attached to the mail to a local storage device to store and manage therein.

The extension of an attached file may distinguish a file format or type. The extension of an attached file may be generally distinguished by a character string indicating file attributes or an application creating the file. For example, a text file may be distinguished by an extension such as [file name].txt, an MS-word file by [file name].doc (docx), and a Hangul file by [file name].hwp. In addition, the extension of an image file may be classified into gif, jpg, png, tif, and the like.

In addition, an execution file, which is a computer file performing a task directed according to a coded command, may be classified into [filename].com, [filename].exe, [filename].bat, [filename].dll, [filename].sys, [filename].scr, and the like.

The hash information of the attached file may guarantee integrity of information by inspecting forgery and alteration of the information. The hash information or hash value may be mapped to a bit string of a predetermined length for arbitrary data having a predetermined length through a hash function.

Through this, hash information output through the hash function for the initially created attached file has a unique value. The output hash information or hash value has a unidirectionality that does not allow extraction of data inversely input into the function. In addition, the hash function may guarantee avoidance of collision that cannot be accomplished by calculation of another input data that provides an output the same as the hash information or hash value output for one given input data. Accordingly, when data of the attached file is changed or added, the hash function returns a different output value.

As the unique hash information of the attached file allows comparison of hash information or hash value for a file exchanged through a mail in this way, modification, forgery, alteration of the file can be confirmed. In addition, since the hash information is fixed as a unique value, preventive measures can be taken in advance by utilizing reputation information, which is a database of history for the files created with a malicious intention. In addition, the hash function may be used in a technique and version that can guarantee unidirectionality and collision avoidance.

For example, the hash information may be used as information for searching for existence of malware in a file through a Virus Total website or a Malwares website. Information such as a file provider, a hash value of a file, and the like may be provided through a website that provides analysis of hash information of the file. In addition, as a result of searching for the hash information of a file may be used to cross-check the reputation information determined by global companies that provide a number of IT information security solutions, it is possible to determine with more reliable information.

According to a preset targeted email security threat inspection process, the targeted email security threat inspection unit 130 may process step-by-step matching of a mail security inspection process corresponding to the mail information, inspect the mail information by the matching-processed mail security process, and store and manage mail security inspection information according to a result of the inspection.

Here, the targeted email security threat inspection process may include at least one among a spam attack threat inspection targeting a specific email account, a malware email attack threat inspection, a social engineering email attack threat inspection, and an email information leakage threat inspection, using the security threat information synchronization data in correspondence to a new inbound mail or a new outbound mail.

In addition, these spam attack threat inspection, malware email attack threat inspection, social engineering email attack threat inspection, and email information leakage threat inspection have a stepwise priority set in advance according to each security threat type and may be processed sequentially.

In addition, as the targeted email security threat inspection process, a different email security process corresponding to a new inbound mail or a new outbound mail may be determined. In addition, the inspection target, inspection order, or inspection method of the mail security process may be determined in advance by the synchronized security threat information synchronization data.

The targeted email security threat inspection process may allocate an independently separated process as a resource when mail information for reception (inbound) or transmission (outbound) is transmitted from the user terminal 200, and may be immediately executed in an inspection area allocated from the mail information. The flexible resource allocation method may be explained as the concept of virtual space. In the method of allocating resources to the virtual space, the mail security process may immediately process a task in the inspection area allocated from sequentially inbound mail information upon completion of processing.

In contrast, an environment in which a predetermined process that is limited to be performed with one resource like a virtual environment or a virtual machine is allocated may have an idle time, during which other processes should wait for a specific process to be completed, to process a requested task. In the analysis method performed through a process, flexible resources may be advantageous in terms of processing speed and performance compared to fixed resources.

The targeted email security threat inspection unit 130 may classify mails for receiving or transmitting purposes according to the mail information collected by the inspection data collection unit 120. Thereafter, the targeted email security threat inspection unit 130 may acquire targeted email security inspection information for each mail by matching and analyzing the mail security processes sequentially or on the basis of a set priority.

Here, the targeted email security threat inspection unit 130 may inspect attack types without having malware, in addition to email threat types using malware. Specific types of targeted email attacks may include not only malware attacks, but also social engineering attacks such as phishing, account takeover, or the like, and this may also include unintentional or intentional information leakage attacks.

Accordingly, the targeted email security threat inspection unit 130 includes a spam attack threat inspection unit 131, a malware attack threat inspection unit 133, a social engineering attack threat inspection unit 135, and an information leakage inspection unit 137 to detect attacks of each type in steps.

Here, the targeted email security threat inspection unit 130 may use the security threat information synchronization data configured in advance by the security threat information synchronization processing unit 140.

To this end, the security threat information synchronization processing unit 140 may configure the security threat information synchronization data by synchronizing the targeted email security threat information configured by performing a targeted email security threat inspection on an inbound mail with the targeted email security threat information configured by performing a targeted email security threat inspection on an outbound mail.

Here, the security threat information synchronization data may include malicious file information and identification information about malicious accounts collected from each inspection process and external security servers, and may be configured by synchronizing the targeted email security threat information configured by performing a targeted email security threat inspection on an inbound mail with the targeted email security threat information configured by performing a targeted email security threat inspection on an outbound mail.

For example, the security threat information synchronization data may include file information inspected as having a high malicious threat level in the targeted email security threat inspection on a specific inbound mail, or sender's account information inspected as having a high possibility of phishing or account takeover.

In addition, the security threat information synchronization data may include file information inspected as having a high information leakage threat level in the targeted email security threat inspection on a specific outbound mail, or receiver's account information inspected as having a high possibility of phishing or account takeover.

In addition, the security threat information synchronization data may include look-alike domain inspection information including an email account and domain information detected as being associated with a look-alike domain attack.

In addition, the security threat information synchronization data may include account takeover attack inspection information including email account and domain information detected as being associated with an account takeover attack.

In addition, the security threat information synchronization data includes zero-day URL attack inspection information that changes the redirection path information of the URL link after the date receiving a mail, and zero-day malware inspection information, which deals with malware or hacking attacks that make use of system security vulnerabilities after they are discovered and before patches for preventing them are released.

In addition, the security threat information synchronization data may further include delivery routing information including email server information, waypoint information, and sender information.

Furthermore, the security threat information synchronization data may be continuously updated using inspection data processed in each processing unit of the targeted email security threat inspection unit 130, and accordingly, integrated security management of the transmitting and receiving security systems is possible, and internal system damage or information leakage to the outside due to targeted email attacks may be effectively prevented in advance.

This security threat information synchronization data is information inspected in each security inspection process described below, and may include, for example, unknown malware information, attached file malware information, URL malware information, header forgery and alteration information, look-alike domain information, account takeover information, URL phishing information, intentional information leakage information, unintentional information leakage information, and unauthorized email server access information.

To perform this inspection process and configure the security threat information synchronization data, first, the targeted email security threat inspection unit 130 may include a spam mail inspection unit 131.

When the mail security process is a spam mail security process, the spam mail inspection unit 131 may match the mail information including mail header information, mail subject, mail message body, the number of times of receiving mail during a predetermined period, and the like to preset spam indexes step by step.

Here, the spam mail security threat may include mail types unilaterally and indiscriminately distributed to unspecified many people in large quantities for the purpose of advertisement, public relations, and the like between unrelated senders and receivers. In addition, a large quantity of spam mails may impose load on the data processing power of the mail system and lower the processing capability of the system. In addition, the spam mail has a risk in that users may be unintentionally linked to indiscriminate information included in the message body or the like, and it may be disguised as information for potential phishing scam.

Accordingly, the spam mail inspection unit 131 may use mail information including mail header information, mail subject, mail message body, and the like as inspection items in the spam indexes through a predetermined pattern inspection or the like that may classify a mail as a spam mail. Through this, the spam mail inspection unit 131 may acquire, store, and manage spam mail inspection information by matching the spam indexes step by step.

In addition, the targeted email security threat inspection unit 130 may further include a malware attack threat inspection unit 132.

The malware is a code that may access memory in a victim's computer system and damage or delete files and programs. Here, the malware attack, which is a targeted email security threat inspection target, may be largely divided into three types of attacks, and the malware attack threat inspection unit 133 may confirm the synchronized security threat information synchronization data for performing an inspection process for each attack type, and transfer inspection data according to a result of the inspection to the security threat information synchronization processing unit 140 to update the security threat information synchronization data.

First, an attack type for an unknown malware means an attack using new unknown malware that is difficult to detect in a vaccine test as it is not registered in a big data database. For example, an attacker may insert an attached file including new malware that cannot be detected by security solutions and transmit an email inducing click of a user by abusing the zero-day vulnerability of distributing malware, in a method of redirecting the access path of a URL link or an attached file in a mail after a predetermined period of time rather than on the day of sending the mail.

In addition, the malware attack of an attached file is typically a type of threat in which an attacker hides malware inside a file that is sent through an email, and the attached file of a malicious email may be disguised as a document, a compiled and executable file, and even an image or video file, or may be even an encrypted file using a different extension. Furthermore, an attack using an executable file may forge the sender's address to deceive the receiver to open the email including a malicious document or may include an attack that inserts malware in an image and attaches the image to the email message body.

Meanwhile, the malware attack using a URL may be a type of attack that inserts a clickable link including malware into an email with the purpose of temping the user to a malicious website. As a malicious URL may be included in a large attached file or the email message body, it may also include an attack that may cause malware to be executed only when delivered, as well as when the user clicks the URL in the email or a general attached file.

In order to perform the security inspection process for each type described above, the malware attack threat inspection unit 132 may match the mail information further including hash information of the attached file, the name of the attached file, the contents body of the attached file, uniform resource locator (URL) information, and the like, to a preset malware index step by step.

The malware attack threat inspection unit 132 may use the contents body of the attached file and the uniform resource locator (URL) information included in the message body, together with the extension of the attached file, hash information of the attached file, the name of the attached file, and the like, which can be confirmed from the attribute values of the attached file, as malware index inspection items. Through this, the malware attack threat inspection unit 132 may acquire malware inspection information by matching the malware indexes step by step according to each type and item, store and manage the malware inspection information through the record management unit 170, and provide the malware inspection information to the security threat information synchronization processing unit 140 to process update of the security threat information synchronization data.

Inspection items based on the items included in the mail information in steps and level values obtained through the inspection may be set as the malware indexes, and each inspection level value may be updated according to the security threat information synchronization data described above.

For example, malware index level 1 may match the name of an attached file or the extension of the attached file included in the mail information on the basis of big data and reputation information acquired from the security threat information synchronization data. Through this, malware index level 1 may acquire an evaluated level value as inspection information of malware index level 1. For example, when the name of an attached file or the extension of the attached file, which are inspection items, includes 'Trojan' or 'exe', and matches the information defined as malware in the big data and reputation information, the inspection information of malware index level 1 may be evaluated as '1' among the level values classified into 0 and 1. Through this, inspection information of malware index level 1 may be acquired as '1'.

In addition, malware index level 2 may match hash information of an attached file of a mail on the basis of big data and reputation information acquired from the security threat information synchronization data. Through this, an evaluated level value may be acquired as inspection information of malware index level 2. For example, when the hash information of the attached file, which is an inspection item, is analyzed as 'a1b2c3d4', and matches the information defined as malware in the reputation information, the inspection information of malware index level 2 may be evaluated as '1' among the level values classified into 0 and 1. Through this, inspection information of malware index level 2 may be acquired as '1'.

As the next step, malware index level 3 may match uniform resource locator (URL) information included in the attached file or the mail message body on the basis of URL reputation information acquired from the security threat information synchronization data. Through this, an evaluated level value may be acquired as inspection information of malware index level 3. For example, when the URL information, which is an inspection item, is confirmed as 'www.malicious-code.com', and matches the information defined in the URL reputation information as a harmful site including a malware file, the inspection information of malware index level 3 may be evaluated as '1' among the level values classified into 0 and 1. Through this, inspection information of malware index level 3 may be acquired as '1'. In addition, the malware attack threat inspection unit 132 may respond to zero-day attacks that may be omitted in the URL reputation information. The malware attack threat inspection unit 132 may change a link IP address of a URL without having reputation information to the IP address of a specific system and provide the changed IP address to the user terminal 200. When the user terminal 200 desires to access the URL, it may access the IP address of the specific system changed by the malware attack threat inspection unit 132. The specific system that has been previously changed to the link IP address of the URL may continuously inspect whether or not malware is included up to the endpoint of the URL.

Meanwhile, the malware attack threat inspection unit 133 allows a manager to classify and configure emails identified as malicious files through malware classification management using the security threat information synchronization data to identify unknown malware, and accordingly, although the user requests retransmission, it may process not to transmit viruses or the like.

In addition, the malware attack threat inspection unit 133 may perform a multi-analysis inspection for inspection of unknown malware, and the multi-analysis inspection may combine a static inspection and a dynamic inspection to detect new viruses that are not detected in a first-stage inspection by inspecting behaviors of malware attacking the system. Results of the behavior inspection may be categorized into, for example, 'forgery', 'memory access', 'hooking warning', 'file creation', 'file deletion', and 'process execution', and according thereto, the malware attack threat inspection unit 133 may inspect malware attack threats from the behavior inspection result information and transfer the inspection result to the security threat information synchronization processing unit 140 to be used to update the security threat information synchronization data.

For example, the malware attack threat inspection unit 133 may perform a virus test configured of three stages, and may inspect malware attack threats using the inspection result at each stage by processing a first-stage inspection (vaccine inspection), a second-stage test (test of environmental change in the operating system), and a third-stage test (behavior-based analysis test) in steps.

In addition, the malware attack threat inspection unit 133 may extract malicious attached files that require additional inspection by regularly scanning all incoming (inbound) and outgoing (outbound) email data of a user through cloud services in order to perform an inspection based on security threat information synchronization data and big data.

In addition, the malware attack threat inspection unit 133 may determine whether there is a risk of a targeted email attack on the basis of the security threat information synchronization data constructed as big data by the security threat information synchronization processing unit 140. The big data analysis function may identify and detect even forged extensions (e.g., .doc, .docx, .ppt, .pptx, .pdf, .txt, .rtf, etc.) as targets of malware analysis.

Meanwhile, when malware of a URL is detected, the malware attack threat inspection unit 133 may convert URL data of mail information delivered to the inbound mail processing unit 150 into an image. Accordingly, it may be processed not to open the URL link in a risky detection environment where the attached malicious URL is recognized.

In addition, the malware attack threat inspection unit 133 may monitor potential risks through the endpoint URL monitoring described above and continuously track and process the final destination of all URLs in the email message body or document file. Here, the malware attack threat inspection unit 133 may track all URLs as interconnected n-th URL. In addition, the malware attack threat inspection unit 133 may confirm the document file included in the email message body through the URL, and particularly, in the case of a large attached file, all URLs of the malicious attached file or document file may be tracked even for large attached files that are downloaded by bypassing the URL of the email message body after the download is completed.

In addition, the malware attack threat inspection unit 133 may reinspect access to the URL in real time through file and endpoint scanning when the user attempts to click a URL link after receiving the email, and perform URL post-testing to limit access when a risk is detected. Information on the URL post-testing according thereto may be updated in real time in the security threat information synchronization data, and the inbound mail processing unit 150 and the outbound mail processing unit 160 may perform a process such as blocking targeted email attacks, user notification, and the like with reference to the URL post-testing result confirmed using the security threat information synchronization data.

In addition, the malware attack threat inspection unit 133 may perform image-based filtering to inspect malware attacks, and this may detect text malicious graphic images configured to avoid text-based filtering or malicious attached file filtering.

In this way, the inspection information acquired in units of malware index levels through the malware security process may be finally summed up as '3' and stored and managed as malware inspection information. The malware inspection information summed up in this way may be provided to the security threat information synchronization processing unit 140 to be used to update the security threat information synchronization data.

As a first type of the malware email attack described above, the zero-day malware is not registered in the big data database, and unknown malware used by an attacker is difficult to detect in a security system. Vulnerabilities of the zero-day malware may be abused for sending an email that inserts an attached file or clickable link including unknown malware that cannot be detected by a security system to induce a user to click a place that the user should not click. In addition, the zero-day malware may also access the memory in a computer system of the user to damage or delete files and programs.

Meanwhile, as a security requirement for responding to the zero-day malware attack as described above, a behavior-based analysis inspection should be performed to detect new viruses that are not registered in the pattern to respond to threats of new malware attacks. In addition, a description about the behavior of newly discovered or detected malware should be reported manually or through an automated process.

In addition, as a countermeasure against the zero-day malware as described above, malware classification management and multi-analysis inspection are performed. Through the malware classification management, a security manager may set emails identified as malicious files, and viruses are not delivered although the user requests retransmission. In addition, the multi-analysis inspection is a combination of static testing and dynamic testing, and detect unknown malware, which is not detected in primary testing, through environmental operating system change testing that inspects the operation of malware in the system. Behavior results are divided into, for example, 'forgery', 'memory access', 'hooking warning', 'create file', 'delete file', and 'run process'.

As a second type of the malware email attack described above, malware included in an attached file is a type of attack that an attacker hides malware in a file that is normally transmitted through an email. The attached file in the malicious email may be disguised as a document, an executable file, or an image or video file. These files may be encrypted with different extensions. Attacks using an executable file may include spoofing the sender's address to deceive a receiver to open an email including a malicious document.

Meanwhile, as a security requirement for responding to the attached file malware attack as described above, counterfeit file extensions of various file formats may be detected, and email reputation analysis may be provided.

In addition, as a countermeasure against the attached file malware attack as described above, a big data-based inspection is performed. The big data-based inspection extracts malicious attached files that require additional inspection by regularly scanning all inbound and outbound email data of the user through a cloud service, and determines whether there is a risk of targeted email attack on the basis of the data stored in the big data system. In addition, this function identifies and detects forged file extensions.

As a third type of the malware email attack described above, malware in URL attack is an attack that inserts a clickable link including malware into an email to induce the user to visit a malicious website. A malicious URL may be included in a large attached file and/or the email message body. This could be an attack that executes the malware when the user clicks a URL in an email or a general attached file, as well as during the transmission of an email.

Meanwhile, as a security requirement for responding to the URL malware attack as described above, the final destination of a URL should be tracked within multiple connected URLs while confirming whether all the URLs include malware. In addition, when a user executes a URL after receiving an email, a post-URL should be confirmed to prevent the malware attack. In addition, URL link opening may be disabled to prevent a user from accidentally clicking a malicious URL.

In addition, as a countermeasure against the URL malware attack as described above, URL image conversion, endpoint URL monitoring, and URL post testing are performed. The URL image conversion prevents URL links not to be opened in a dangerous environment where attached malicious URLs are recognized. The endpoint URL monitoring continuously tracks the final destination of all URLs in the message body of an email or a document file by monitoring potential risks. For example, for large attached files that are downloaded by bypassing the URLs in the email message body, all URLs in the malicious attached files or document files should be tracked after downloading. In addition, the URL post-test reinspects URL access in real time by scanning the files and endpoints when a user attempts to click a URL link after receiving an email, and restricts access when a risk is detected. In addition, a new URL is generated through the inbound email security for inspection purpose whenever the URLs are accessed, and a user may be redirected to the original URL when there is no problem.

Meanwhile, the targeted email security threat inspection unit 130 may further include a social engineering attack threat inspection unit 135. The social engineering attack threat inspection unit 135 is executed when the mail security inspection process is a social engineering attack threat security process, and may match social engineering attack analysis data acquired from mail information item by item on the basis of the security threat information synchronization data and social engineering attack security threat items set in advance. The social engineering attack analysis data may be acquired by performing an analysis process for each attack type corresponding to the mail information.

For example, the social engineering attack threat inspection unit 135 may use the inbound mail domain, outbound mail domain, inbound mail address, outbound mail address, mail routing information, mail message body information, and the like, which can be extracted from a mail determined as normal, as social engineering attack threat inspection items. Through this, the social engineering attack threat inspection unit 135 may acquire, store, and manage social engineering attack threat inspection information by performing a type inspection for each of the social engineering attack threat inspection items.

More specifically, the social engineering attack threat inspection unit 135 may perform header forgery and alteration inspection, look-alike domain inspection, account takeover inspection, and URL phishing inspection when performing an attack type inspection for each social engineering attack threat inspection item.

A forged header is a type of social engineering attack that avoids detection by forging account information of the header. Attackers use email header forgery to bypass the destination of the email when a user sends a reply. Through the forged header attack, attackers may intercept emails of normal users that may include credential information of the company and personal information. Inspection of the header forgery and alteration may include inspection of detecting forgery of the email header that allows an attacker to bypass the mail destination in the reply of the user. When the header is forged or altered, there is a risk in that the attacker may intercept emails of general users that may include credential information of the company and personal information.

Meanwhile, as a security requirement for responding to the forged header attack as described above, the user should be blocked or warned when the email address is different in the reply of an inbound email, and whether the email complies with email communication protocols should be confirmed. Accordingly, the social engineering attack threat inspection unit 135 may detect and block such header forgery and alteration attacks in advance through header forgery and alteration inspection. According to the inspection information of the social engineering attack threat inspection unit 135, the outbound mail processing unit 160 may block email in advance in the case where the reply email address is different when the user replies to an inbound mail, or may perform a warning process to the sending user. For this process, the social engineering attack threat inspection unit 135 may confirm in advance whether the email communication protocol is authenticated.

In the header forgery and alteration inspection, the social engineering attack threat inspection unit 135 may detect a forged sender address from an email by confirming whether the email of the sender complies with a communication protocol (e.g., SPF, DKIM, DMARC) through authentication of the email communication protocol.

In the header forgery and alteration inspection, the social engineering attack threat inspection unit 135 may also manage the reputation of the IP address and domain by the sender and confirm whether the email address has a trustworthy domain.

In addition, as a countermeasure against the forged header attack described above, analysis of email header information and communication protocol authentication are performed. It is confirmed whether the sender header value (From: <id@domain>) of the inbound email is the same as or different from the address header value (Reply-To: <id@domain>) of the reply by analyzing email header information, and a filtering result is provided by confirming which part of each header value is different. In addition, communication protocol authentication detects forged sender address from the email by verifying whether the sender's email complies with the communication protocol (e.g., Sender Policy Framework (SPF), DomainKeys Identified Mail (DKIM)), manages the sender reputation of the IP address and domain, and confirms whether the email address has a trusted domain. For example, for the header forgery and alteration inspection, the social engineering attack threat inspection unit 135 may analyze email header information and confirm whether the sender header value (From: <id@domain>) of the inbound email is different from the address header value (Reply-To: <id@domain>) of the reply.

In addition, the social engineering attack threat inspection unit 135 may determine which part of each header value is different and output step-by-step filtering results as an inspection result. For example, in the case of ID forgery and alteration, this may correspond to an email in which the 'ID' of the sender header value (From: <ABC@XYZ.com>) is different from that of the reply address header value (Reply-To: <BAC@XYZ.com>). In addition, in the case of domain forgery and alteration, this may correspond to an email in which the 'Domain' of the sender header value (From: <ABC@XYZ.com>) is different from that of the reply address header value (Reply-To: <ABC@YXZ.com>). In addition, in the case of address forgery and alteration, this may correspond to an email in which the sender's address is different from that of the reply, and in the case of signature forgery and alteration, this may correspond to an email in which the signature part in the email message body is different.

The look-alike domain inspection is inspecting the type of an attack in which an attacker sends a malicious email in an email address, and may include a case where although the email address is as very similar as not to be distinguished from a normal and familiar address of the sender with human eyes, it is a malicious domain of the attacker. For example, the uppercase 'I' and the lowercase 'l' are similar in the shape, and the similarity may be abused for attacks.

As a security requirement for responding to the look-alike domain attack as described above, when the sender's domain is detected as a look-alike domain on the basis of accumulated email history, the level of risk similarity should be notified to the user, and the email should be blocked. In addition, the difference in the number of email addresses should be applied as a criterion for determining a similar email fraud attack, and when the top-level domains (TLDs) are different, they should be managed separately. In addition, a security manager should be allowed to directly register fraudulent look-alike email addresses that look suspicious. Accordingly, the social engineering attack threat inspection unit 135 may inspect whether the sender's email address or domain is a look-alike domain on the basis of accumulated email history, and the inbound mail processing unit 150 may notify the user of the level of risk similarity and block corresponding emails.

Here, the social engineering attack threat inspection unit 135 may use information on the number of letters similar but not identical to each other between the email address of the email history cumulatively managed in the security threat information synchronization data and the email address included in the header information of a new mail as a criterion for determining whether the new mail is a similar mail fraud attack and the possibility of a social engineering attack threat. For example, the social engineering attack threat inspection unit 135 may determine that the possibility of a social engineering attack threat increases as the number of letters not identical but similar to each other decreases, and calculate the determination result as a risk level and output the risk level as a test result.

In addition, an email security manager may register suspected look-alike email addresses in the security threat information synchronization data, and the email addresses may be separately classified and managed only when the top-level domains (TLD) are different while the email addresses are similar.

More specifically, the social engineering attack threat inspection unit 135 may detect a mail of a look-alike domain including as many similar letters as less than or equal to the number of specific letters (e.g., 3 letters) that is generally difficult for a user to distinguish as a social engineering attack threat mail by calculating similarity between the domain information included in the header information of a new mail and the accumulated domain information included in the mail history of the security threat information synchronization data synchronized by the security threat information synchronization processing unit 140.

Accordingly, the inbound mail processing unit 150 or the outbound mail processing unit 160 may perform a targeted email security threat response process that includes a process of blocking reception or transmission of the mail, delaying reception or transmission of the mail, deleting the mail, transmitting a notification message warning the user, or the like according to the result of the social engineering attack threat inspection corresponding to the new mail.

As a countermeasure against the look-alike domain attack described above, domain The domain similarity calculation accumulates sender similarity calculation is performed. domains of inbound emails and analyzes newly received emails by comparing with the accumulated domains. Meanwhile, look-alike domains with less than 3 characters and are difficult to identify may be blocked. Inbound emails are suspended or blocked when the top-level domain (TLD) is modified, the order of the character string array is changed, or a character in a character string is changed to a similar character or characters creating a character string set. However, to avoid false positives, domain similarity may not be determined only by the simple difference in the number of characters. For example, when the top-level domain (TLD) of the sender domain of a new inbound mail is partially modified, the character string array is partially rearranged, or one character among the character string is changed to a similar character or another character in comparison with other existing mail history information included in the security threat information synchronization data, the social engineering attack threat inspection unit 135 may detect a social engineering attack threat level, and output the detected threat level to the inbound mail processing unit 150 as an inspection result. The inbound mail processing unit 150 may selectively perform a process of blocking, delaying, or deleting the new inbound mail and process a notification message warning the user according to the threat level on the basis of a preset look-alike domain processing policy.

The look-alike domain risk level of the social engineering attack threat may be classified into, for example, five levels as follows according to the degree of change of characters not matching but similar to each other in comparison with other existing mail history information included in the security threat information synchronization data.

That is, the social engineering attack threat inspection unit 135 may perform an inspection process of inspecting in steps whether the sender domain included in the new inbound mail is similar to, although not matching, the domain included in the accumulated domain information using the accumulated domain information acquired from the security threat information synchronization data by performing the look-alike domain inspection, and output a look-alike domain attack risk level of the social engineering attack threat, which is classified into five levels as shown below, as an inspection result.

TLD level: When the last segment of an email domain (e.g., .com, .net, .org, etc.) is changed to a similar character.

Low level: When three or more among the email address alphabet have been changed to distinguishable similar characters.

Normal level: When two among the email address alphabet have been changed to distinguishable similar characters.

High level: When one among the email address alphabet has been changed a distinguishable similar character.

Risky level: The email address alphabet is configured of only similar characters difficult to distinguish (e.g., l (lowercase of L) and I (uppercase of i)).

According to such a configuration, the social engineering attack threat inspection unit 135 may calculate in steps a degree of similarity of a look-alike domain detected as being similar to, although not matching, the domain included in the accumulated domain information on the basis of the number of similar characters through the inspection process of inspecting in steps, and determine the threat level of a look-alike domain-based social engineering email attack of the new outbound mail or the new inbound mail on the basis of the degree of similarity based on the number of similar characters.

Information on the threat level of a look-alike domain-based social engineering email attack is configured as targeted email security threat inspection data of the new mail and is transferred to the inbound mail processing unit 150 or the outbound mail processing unit 160, and a corresponding process of blocking, delaying, or deleting the mail and notifying the user of warning may be performed.

Meanwhile, the social engineering attack threat inspection unit 135 may perform an account takeover (ATO) inspection to detect a social engineering attack threat using an actual user's account.

Through the account takeover attack, an attacker may attempt to log into a stolen email account and explore records of the user's mail to find confidential information and potential secondary victims. For example, the attacker may send an email requesting to change a remittance account or transfer confidential information stored in the account to the outside, using account information stolen from a phishing site.

As a security requirement for responding to the account takeover (ATO) attack as described above, when the sender's location of a mail is different from that of the previously received mail, the user should be warned or the mail should be blocked. In addition, when the email server's IP address is different from that of the previously received email, the user should be warned or the email should be blocked, and when the email transmission path is different from that of the previously received email, the user should be warned, or the email should be blocked. To this end, the social engineering attack threat inspection unit 135 according to an embodiment of the present invention may perform an account takeover inspection of detecting social engineering attack threats that use account takeover, using learning data of each account takeover inspection item acquired from the security threat information synchronization data of the security threat information synchronization processing unit 140.

To this end, the security threat information synchronization processing unit 140 may configure accumulated learning data of each account takeover inspection item, and configure a learning model that outputs the possibility of the new outbound mail or the new inbound mail for being a mail sent by a stolen account, according to the artificial intelligence model learning process between the configured learning data and the email item data of an actual account takeover case. Here, the artificial intelligence model learning process is a known artificial intelligence deep learning neural network technique, and various known learning techniques such as CNN, DNN, RNN, LSTM, regression analysis, and the like may be applied.

In addition, as the account takeover inspection item data of the new outbound mail or the new inbound mail is applied to the learning model of the accumulated learning data of each account takeover inspection item, the social engineering attack threat inspection unit 135 may perform an inspection process of inspecting whether the new outbound mail or the new inbound mail is a mail sent by a stolen account.

For example, according to the learning model described above, the security threat information synchronization processing unit 140 may learn the header structure information of mail information for account takeover inspection, and the social engineering attack threat inspection unit 135 may input the header structure information of a new inbound mail or a new outbound mail into the configured header structure learning model to inspect the validity corresponding to the account takeover inspection. This account takeover inspection method includes a comparative analysis between artificial intelligence-based learning records of past data of email and current new data.

In addition, the social engineering attack threat inspection unit 135 may perform an account takeover inspection according to a preset inspection process using sender history information, as well as the learning model.

More specifically, the accumulated learning data of each account takeover inspection item may include sender history information acquired from the mail header of the inbound mail or the outbound mail, and the account takeover inspection of the social engineering attack threat inspection unit 135 may include an inspection process of inspecting whether the new outbound mail or the new inbound mail is a mail sent by a stolen account, by comparing the accumulated learning data of the sender history information with the sender location information or the sender IP information of the new outbound mail or the new inbound mail.

Here, the sender history information may include initial destination information, waypoint information, and final destination information configured on the basis of the mail transmission IP and the mail server IP, and the account takeover inspection may include an inspection process of inspecting whether the new outbound mail or the new inbound mail is a mail sent by a stolen account, by comparing the initial destination information, the waypoint information, or the final destination information acquired from the header of the new outbound mail or the new inbound mail.

More specifically, when an account takeover occurs, the sender's location or IP address is highly probable to be changed. Accordingly, the security threat information synchronization processing unit 140 may cumulatively manage the sender's location information and IP history information by mapping them to the security threat information synchronization data, and for the sake of account takeover inspection, the social engineering attack threat inspection unit 135 may inspect whether the sender's location information and IP history information have been changed by analyzing the header information of the mail information.

Here, the sender's location information and IP history information may include the sender's country information, sender's IP address information, and server IP address information. Particularly, the header information of an email may include IP information from which the email is initially created and sent (initial destination information), server IP address to which the email is delivered (waypoint information), and IP information of the server to which the email is finally delivered (final destination information).

That is, as the initial destination information, the waypoint information, and the final destination information are included in the email header information as the IP address history of the sending server for mail transmission, the security threat information synchronization processing unit 140 may cumulatively manage the sender's location information and IP history information including the initial destination information, waypoint information, and final destination information by mapping them to the security threat information synchronization data.

In addition, the social engineering attack threat inspection unit 135 may inspect whether the sender's account has been stolen by comparing the initial destination information, waypoint information, and final destination information acquired from each cumulatively managed sender's location information and IP history information with the header information of a new mail.

More specifically, for example, a case of determining as an account takeover may be illustrated as shown below.

A case where the initial destination is changed: A case identified as a change in the country, where the sender's location and the initial destination of the IP of the email included in the header information of the new mail (the IP address of the mail server from which transmission of the email is initially requested) is different from each cumulatively managed sender's location information and IP history information. (Example: The cumulatively managed sender's initial destination is 1.1.1.1 (Country A), and the final destination is 2.2.2.2 (Country A), whereas the initial destination of the header of the new mail is 3.3.3.3 (Country B), and the final destination is 2.2.2.2 (Country A)).

A case where the final destination is changed: A case identified as a change in the country, where the sender's location and the final destination of the IP of the email included in the header information of the new mail (the IP address of the mail server that has finally processed transmission of the email) is different from each cumulatively managed sender's location information and IP history information. (Example: The cumulatively managed sender's waypoint is 1.1.1.1 (Country A), and the final destination is 2.2.2.2 (Country A), whereas the waypoint of the header of the new mail is 3.3.3.3 (Country B), and the final destination is changed to 3.3.3.3 (Country B)).

As a countermeasure against the account takeover (ASTO) attack described above, learning and verification of email data for the same sender and analysis of sender location change detection are performed. After learning email data of the same sender, a received mail should be analyzed in real time to perform learning data and verification. Here, learning data validity inspection includes learning the configured header structure and social graph, and comparing and analyzing past learning records and current data when sending an email. The sender location change detection includes analyzing header information of a received mail, accumulating sender location IP history, and comparing a newly received mail with the originating IP country of the accumulated history. The mail header includes the IP from which the mail is written first, server IPs until the time of sending, and IP information of the server from which the mail is finally transmitted. Accordingly, IP history for the destinations (first destination, waypoints, final destination) of all inbound emails is accumulated, and when the country of the new inbound email sender location IP is different from that of the previous received email, authenticity of the sender is detected. Accordingly, the social engineering attack threat inspection unit 135 may perform an account takeover attack inspection and transmit an inspection result to the inbound mail processing unit 150 and the outbound mail processing unit 160.

For example, when the sender's current location is different from that of a previously received email, the outbound mail processing unit 160 may warn the user of a result of the account takeover inspection or block the outbound email. In addition, when the IP address of the received email server is different from that of a previously received email, the inbound mail processing unit 150 may warn the user of a result of the account takeover inspection or block the email. Furthermore, when the transmission path of the current email is different from that of a previously received email, the inbound mail processing unit 150 may warn the user of a result of the account takeover inspection or recommend blocking of the email. In addition, the social engineering attack threat inspection unit 135 may perform an inbound management function of blocking email according to a specific band or an IP band.

Meanwhile, the social engineering attack threat inspection unit 135 may further perform URL phishing inspection. URL phishing is an attack of stealing the ID and password of a victim, and the attacker creates a phishing page or a website to induce the victim to input account information using a malicious URL or file included in an email.

As a security requirement for responding to the URL phishing attack as described above, the final destination of a URL including a webpage that induces to input personal information should be continuously tracked. For example, for the sake of phishing inspection, the social engineering attack threat inspection unit 135 tracks the final destination of a corresponding URL within the URL when an email user accesses a phishing site and inputs an ID and password, and may confirm whether a webpage that induces input of personal information is included in the URL.

As a countermeasure against the URL phishing attack, tracking of URL endpoints and analysis of HTML source code of a webpage are performed. In order to track the endpoints of a URL, the final destination of all URLs should be tracked, the possibility of information input guidance should be monitored. In addition, it should be confirmed whether there is an input text box that induces a user to provide his or her personal information or account information such as an ID and password by analyzing the HTML source code of the webpage, and whether the input information is transferred to a third-party server should be inspected.

In this way, the inspection information acquired through the social engineering attack threat inspection process may be finally summed up as '3' and stored and managed as social engineering attack threat inspection information. The social engineering attack threat inspection information summed up in this way may be transmitted to the security threat information synchronization processing unit 140 to be used to update, store, and manage the security threat information synchronization data, and transmitted to the inbound mail processing unit 150 and the outbound mail processing unit 160 to be used as security threat determination information.

Meanwhile, the targeted email security threat inspection unit 130 may include an information leakage inspection unit 137 to respond to internal information leakage security threats. Here, the information leakage inspection unit may inspect whether information of the outbound mail is leaked by utilizing the security threat information synchronization data and attribute information of the mail information, and transfer the inspection information to the outbound mail processing unit 160 to block transmission of the mail or reject approval of sending the outbound mail through the mail server 300.

The information leakage inspection unit 137 may inspect information leakage as a security threat of targeted email attack generated from outbound email threats by a user, i.e., transmission of an email by the user.

First, the information leakage inspection unit 137 may detect deliberate (intentional) information leakage. The intentional information leakage is a behavior of an executive or employee intentionally leaking confidential information of the company and/or personal information of employees to the outside through business or personal emails due to the absence of security policies of the company. When a specific leakage condition corresponding to the deliberate (intentional) information leakage set by the security manager is met in correspondence to an outbound mail, the information leakage inspection unit 137 may transfer the inspection information to the outbound mail processing unit 160 to perform a process of suspending or blocking transmission of the mail. In addition, when a specific leakage condition is met, the outbound mail processing unit 160 may transmit a notification message, a warning notification message, or the like to the user terminal 200 so that the sender may set a transmission delay time for the outbound email.

As a security requirement for responding to the intentional information leakage among the outbound email threats by a user as described above, a security manager should be able to set conditions for email transmission and use a function that can reconsider email transmission when the set conditions are not met.

In addition, the information leakage inspection unit 137 may detect a deliberate (unintentional) information leakage and transfers the detection information to the outbound mail processing unit 160 to block, warn, or delay unintentional information leakage. The unintentional information leakage may occur due to carelessness or negligence of internal employees. On the other hand, when an account user using internal network isolation sends a large attached file on an isolated internal network to the outside, and the attached file includes important information of the company or personal information of other employees, a serious information leakage problem may occur.

As a security requirement for responding to the unintentional information leakage among the outbound email threats by a user as described above, the user should be warned or automatically blocked in replying or sending an email to the email addresses classified as a malicious email address. In addition, the email should be converted to safely transmit a large attached file from a separate internal network to the external network, and the converted email should be restored in order to safely transmit the large attached file from a separate internal network to the external network. In addition, the email sent by the sender should be able to be recalled to prevent information leakage, and the contents should be encrypted for the outbound email that meet specific conditions, such as the IP address from which the email is confirmed, the number of times of opening the email, and the like.

The information leakage inspection unit 137 may detect cases where a user replies or sends an email to an email address classified as a look-alike email address from malicious account data acquired from security threat information synchronization data, configure unintentional information leakage information, and transfer the unintentional information leakage information to the outbound mail processing unit 160. According to the unintentional information leakage information, the outbound mail processing unit 160 may provide a warning about the outbound mail, or automatically block or delay the outbound mail.

In addition, when a large attached file of an email is converted into a general attached file and passes through a network connection system in order to safely transmit the large attached file to an external network in a security network where internal and external networks are isolated, the information leakage inspection unit 137 may inspect a security risk to detect unintentional or intentional information leakage corresponding to the large attached file. This means a case where a large attached file is converted into a general attached file according to a preset email transmission policy to obtain an approval of the network connection system, and in this case, it may include malware inspection, virus inspection, and internal information leakage risk inspection for the large attached file converted into a general attached file. Here, the internal information leakage risk inspection may include inspection of a risk of internal information leakage, which checks whether and how frequently a specific security keyword or specific security phrase is included according to preset security policy data.

In addition, in the case of restoring the large attached file converted and transferred from the external network to the internal network in a security network where the internal and external networks are isolated, the information leakage inspection unit 137 may perform malware inspection, virus inspection, and internal information leakage risk inspection. Particularly, this may correspond to a case where encrypted external network path information of a large attached file is attached as URL information, or a webpage file that can access the encrypted external network path information of the large attached file is attached as a general attached file.

In addition, the information leakage inspection unit 137 may encrypt the contents of an outbound mail when the IP address that has confirmed the mail, the number of times of opening the mail, or the like satisfies a predetermined condition, and the number of mails that have been transmitted is preferably processed not to be access by individual users.

As a countermeasure against the outbound email threat by a user as described above, management of secure email, configuration of applications for approving email, and settings for email delivery limit are performed. A secure email with a link capable of previewing email information (e.g., sender, subject) on a secure web portal is sent instead of sending a real email to the receiver, and at this point, the user should be able to manage the transmitted secure email. In addition, when there is an occasion pending for approval or rejection of a permission request, the approval email should be able to configure identity applications that allow the approver to send an email notifying the user of the fact. Meanwhile, when the email includes specific keywords and attached file types, the approver sets an approval process according to the organization chart. When an approver allows or rejects transmission of an email including a specific keyword that requires approval in the subject, attached file, or file extension, such an email may be transmitted. In addition, when email transmission is limited, a limit on the maximum number of emails that can be sent at a time may be set, and the state of the email server and account security may be maintained by limiting the number of users who can send email a day and the number of receivers per email.

As a countermeasure against the intentional information leakage among the outbound email threats by a user as described above, an outbound blocking policy is set, and an outbound email delay and retrieval/delete function is provided. The outbound blocking policy blocks attempts of leaking information and data through an email by setting an outbound policy appropriate to a company. Blocking policy conditions include a limit on the capacity of attached files and outbound emails (blocking attempts of leaking large data) and capacity of large files, a limit on the image size within the email message body, settings of an exception sender list for a target, keywords in the form of numbers or words that reflect personal information, and file names or file name extensions of attached files. In addition, the email delay and retrieval/delete function may set a delay time between an email sending time and a delivered time, and email transmission may be cancelled within the delay time. The right to cancel the mail within the delay time may be granted to the security manager and the user, and once the mail is canceled, it may not be sent again, and the mail should be created again.

As a countermeasure against the unintentional information leakage among the outbound email threats by a user as described above, email encryption, email conversion, and email retrieval are performed. The email encryption encrypts or disguises contents of an email and an attached file to protect important information not to be read by others except an intended receiver. Meanwhile, it needs to satisfy following conditions for email conversion as email conversion conditions in order to safely transmit an email with a large attached file from a separate internal network to an external network. Security risk of a large attached file inserted to be classified as a general attached file is examined according to preset email delivery policies, and a converted email is transmitted after approval. In addition, it needs to satisfy following conditions for retrieval of a converted email as email retrieval conditions in order to safely transmit an email with a large attached file from a separate internal network to an external network. Security risk of a large attached file inserted to be classified as a general attached file is examined according to preset email transmission policies, and encrypted external network path information for the large attached file retrieved from the converted mail should be attached as URL information, and a webpage file that may access the encrypted external network path information of the large attached file should be attached as a general attached file.

In addition, the targeted email attack threats include outbound email threats by attackers, and the threat type may include a type of using taken-over accounts and a type of unauthorized email server access. In using a taken-over account, an outbound email attack method usually begins after a user's account is stolen, and through the stolen account, the attacker randomly sends subsequence emails abusing personal information of other people included in the inbound and outbound emails of the user. Accordingly, accounts related to an attacked user could potentially be secondary victims and may be reused in phishing attacks later.

Meanwhile, the unauthorized email server access is an outbound email attack method in which an attacker takes control of an email server and acquires control over it, and the attacker may use the stolen account credential to access the corporate email account of the user without permission. For example, when the email server is damaged, the attacker may retrieve the user's password, and the attacker may have an access right to other hosts on the network of the organization.

As a security requirement for responding to the outbound email threat by an attacker as described above, against the attacks using a stolen account, specific IPs and countries are set to allow the security manager and the user to access the email account, and a malicious detection function for sending emails is implemented in the same way that inbound email security requirements are implemented.

In addition, for unauthorized email server access attacks, access to unregistered Simple Mail Transfer Protocol (SMTP) and webmail services of a country should be blocked. Meanwhile, it needs to grasp detailed information on the access in order to determine an unauthorized email server attack, and mail server access request information by an unauthorized email server attack should not be transmitted to the email server. In addition, when the sender's SMTP information does not match the receiver's SMTP information, mail delivery should be blocked.

In addition, as a countermeasure against the outbound mail attack by an external attacker as described above, IP permission setting is performed for the attacks using a stolen account. The IP permission setting may block email attacks by allowing the security manager and the mail user to register specific IP addresses and countries that can be accessed through 'Security IP Registration' or 'Allowed Country Registration' to receive mails from the allowed IP addresses and countries.

Meanwhile, against the unauthorized email server access, the security manager may control secure email links by restricting access to a webmail or a mail client through email server/IP access control. In addition, webmail can be blocked through the registered IP, and mail client communication is blocked by controlling communication access based on POP3 (Client Server Protocol)/SMTP (Mail Transfer Protocol). In addition, emails may be sent from the registered IP addresses and countries, and email server access restriction logs including IP addresses, dates, and the like may be provided. Email server access log may allow to determine whether or not to approve access of a user.

Meanwhile, the inbound mail processing unit 150 and the outbound mail processing unit 160 may process a mail state according to the targeted email security threat determination information acquired through analysis of the mail security inspection information and the mail information.

When the targeted email security threat determination information is determined as an abnormal mail, the inbound mail processing unit 150 and the outbound mail processing unit 160 may process the mail state by determining whether or not to stop subsequent mail security processes. Through this, when a problem is found first at the inspection step, the inbound mail processing unit 150 and the outbound mail processing unit 160 may perform only the processes needed at the inspection step according to the priority, determine whether or not to stop the inspection, and terminate the process without performing subsequent inspection steps. Through this, complexity of the system can be reduced and processing efficiency can be improved by securing efficiency of the mail security service.

Information acquired by combining spam mail attack threat inspection information, malware attack threat inspection information, social engineering attack threat inspection information, and information leakage inspection information calculated by the targeted email security threat inspection unit 130 may be used as the mail security inspection information. For example, when the score calculated from the spam mail inspection information is '3', the score calculated from the malware attack threat inspection information is '2', the score calculated from the social engineering attack threat inspection information is '1', and the score calculated from the information leakage attack threat inspection information is '0', the score summed up as the targeted email attack threat inspection information through the inspection process performed for the mail information by the targeted email security threat inspection unit 130 may be acquired as '7'. At this point, the mail may be classified as a normal mail when the overall score is in a range of 0 to 3 on the basis of the preset security threat determination information, as a gray mail when the overall score is in a range of 4 to 6, and as an abnormal mail when the overall score is in a range of 7 to 12. Accordingly, a mail of which the mail security inspection information is '7' may be determined as an abnormal mail. In addition, a result value of each inspection information item included in the information on mail information inspection may be assigned with an absolute priority according to the item, or the priority may be determined by the information according to a weight.

In addition, as shown in FIG. 4, the inbound mail processing unit 150 may include a mail distribution processing unit 151 for processing a mail determined as a normal mail according to the security threat determination information to put the mail into a receiving or sending state that can be processed by the user terminal.

In addition, the inbound mail processing unit 150 may further include a mail discard processing unit 152 for processing a mail determined as an abnormal mail according to the security threat determination information to put the mail into a state that does not allow access of the user terminal.

In addition, the inbound mail processing unit 150 may further include a mail harmless processing unit 153 for converting a mail determined as a gray mail according to the security threat determination information into non-execution file contents, and providing the non-execution file contents so that the user terminal may selectively process the mail state.

Generally, a gray mail may be classified into a spam mail or a junk mail, or may be classified as a normal mail on the contrary. In the present invention, the gray mail may be defined as a mail type that is classified when the security threat determination information is calculated as a medium value in a predetermined range, which cannot be determined as normal or abnormal. The mail harmless processing unit 153 may convert the gray mail including the message body of suspicious contents into an image file and provides the mail in a state that the user terminal 200 may confirm. In addition, the mail harmless processing unit 153 may remove or modify a part in an attached file being suspicious of malware and provide the mail to the user terminal 200.

Furthermore, the mail distribution processing unit 151, the mail discard processing unit 152, and the mail harmless processing unit 153 may perform the same process on the outbound mail processed by the outbound mail processing unit 160.

Meanwhile, the outbound mail processing unit 160 includes an outbound mail approval system linking unit 161 and an outbound mail filtering processing unit 161.

When a targeted email attack security threat such as information leakage or the like is determined from the mail information of an outbound mail, the outbound mail approval system linking unit 161 may transmit a message requesting to reject approval of the mail to a mail approval system connected to the mail server 300 or process a warning notification.

Here, the outbound mail approval system linking unit 161 may be configured to transmit an email notifying the user of each processing state information when the security manager approves, rejects, or suspends approval of request through the mail approval system.

For example, when a specific keyword and a specific attached file type set by the manager are included, the email approval system may determine approval according to the organization chart. In this case, when a specific keyword that requires approval is detected among the subject, attached file, and file extension, the outbound mail approval system linking unit 161 may configure processing state information, including whether the manager allows or rejects email transmission, as an email and send the email to the sender's account.

Furthermore, the outbound mail approval system linking unit 161 may set a limit on the maximum number of emails that can be sent at a time by limiting transmission of email to the mail approval system. The outbound mail approval system linking unit 161 may maintain the state of the email server and account security by limiting the number of users who can send email a day and the number of receivers per email.

In addition, the outbound mail filtering processing unit 161 may perform a filtering process such as discarding or processing harmless the outbound mail when a targeted email attack security threat such as malware is determined from the mail information of the outbound mail.

For example, when a targeted email attack security threat of an outbound mail requested to transmit is determined, the outbound mail processing unit 160 may process transmission of a secure email including a link capable of previewing the harmless filtered email instead of actually sending an actual email to the email receiver.

In addition, even after sending the user's mail, the outbound mail processing unit 160 may process a post management service corresponding to the targeted email attack security threat on the outbound mail. The post management service is limited to be processed through a special account of a manager or the like, and through the post management service, the outbound mail processing unit 160 may confirm access and inquiry of a receiver for email security, confirm the secure email access IP of the receiver, confirm the secure email access date and time of the receiver, and process the access control (allow/block) of the receiver to the secure email.

In addition, the outbound mail processing unit 160 may perform log monitoring and notification of malicious account information acquired from the security threat information synchronization data, and the monitored log may include detailed log information such as ID, location (country), IP address, date, and state (success or failure).

The outbound mail processing unit 160 may report a result of monitoring the malicious account within the email server in a method of grasping malicious login attempts to the user account, providing a notification to the user terminal, and displaying the notification on a mail or dashboard interface.

Meanwhile, the outbound mail processing unit 160 may process email encryption to prevent intentional information leakage of the mail. The email encryption encrypts or disguises contents of an email and an attached file to protect sensitive information not to be read by anyone other than an intended receiver.

In addition, the outbound mail processing unit 160 may provide a function for delaying transmission and inquiring and deleting outbound mails to prevent intentional or unintentional information leakage. In order to prevent intentional or unintentional leakage of information by a user, the outbound mail processing unit 160 may set a delay time between the sending time and the delivered time, and mail transmission may be cancelled within the delay time. The right to cancel the email within the delay time may be granted to the manager and the user, and once an outbound email is canceled, it may not be sent, and the email should be created again.

In addition, the outbound mail processing unit 160 may limit the country of use and IP address corresponding to the account in order to prevent account takeover attacks in advance. To set the limit, the outbound mail processing unit 160 provides a function that allows security managers and email users to register specific accessible IP addresses and countries through 'secure IP registration' or 'allowed country registration'. Accordingly, users may transmit emails only from permitted IP addresses and countries.

In addition, the outbound mail processing unit 160 may block access to the email server in advance for transmission of an unauthorized mail through email server IP access control.

For example, a manager may control whether or not to allow email links in a transmission mail by limiting access to the webmail or mail client. For example, the outbound mail processing unit 160 may block webmail access transmission using a registered IP, and block transmissions based on mail client communication by controlling access to communication based on POP3 (client server protocol)/SMTP (mail transfer protocol).

In addition, when an email is sent from a registered IP address and country, the outbound mail processing unit 160 may configure, store, and manage an email server access limit log, such as IP addresses, dates, and the like. Then, this email server access limit log may be used to confirm whether the user is allowed to transmit during the next access. To confirm whether the user is allowed to transmit, the outbound mail processing unit 160 may confirm the email server access limit log including user identification information, encrypted email information, user password information, device identification information, access IP information, access time information, access location information, and communication protocol identification information for email engine.

Meanwhile, referring to FIG. 2 again, the record management unit 170 may store and manage the mail information processed according to the targeted email attack security threat determination information as record information. The record management unit 170 may store and manage, when a mail is processed as a normal mail according to the targeted email attack security threat determination information, the record information including the inbound mail domain, outbound mail domain, inbound mail address, outbound mail address, mail routing information, mail message body information, and the like as a trusted authentication information, and transmit, when the mail is processed as an abnormal mail, the record information to the security threat information synchronization processing unit 140 to update the security threat information synchronization data.

In addition, the record management unit 170 includes a learning data processing unit 171 to construct a security threat information learning model for blocking targeted email attacks based on learning of the normal mail and abnormal mail information, and the security threat information learning model may be transmitted to the security threat information synchronization processing unit 140 to be included in the security threat information synchronization data.

Meanwhile, the diagnosis reporting unit 180 may collect processing result information of the targeted email security threat inspection unit 130, configure email security diagnosis service information from the processing result information, and provide the email security diagnosis service information to the user terminal 200 as an email security diagnosis service.

More specifically, the diagnosis reporting unit 180 may collect matching result information for each step of the mail security process processed by the targeted email security threat inspection unit 130, and determine a threat level ratio factor for applying one or more quantitative classification conditions corresponding to the collected matching result information.

In addition, the diagnosis reporting unit 180 may calculate quantitative analysis information corresponding to the threat level ratio factor from the matching result, and determine a mail system to be diagnosed and a score of each threat level class of each mail on the basis of the quantitative analysis information.

Accordingly, the diagnosis reporting unit 180 may configure an email security diagnosis analysis report based on the score of each classified threat level, and provide the configured email security diagnosis analysis report information to the user terminal 200.

As described above, the targeted email security threat inspection unit 130 may classify an email into a spam mail security threat, a malware security threat, a social engineering security threat, and an internal information leakage security threat, and the type, level, process, priority, and processing order of the security threats may be set by the security threat architecture, and a corresponding process of the inbound mail processing unit 150 and the outbound mail processing unit 160 may be performed, and therefore, the number of matching cases of each threat level ratio factor may be calculated by matching each matching processing result to various quantitative classification conditions. These quantitative classification conditions may also be referred to as threat level element classification criteria.

In addition, the diagnosis reporting unit 180 may confirm a comprehensive security threat level of the diagnosis target email system by applying the quantitative analysis information of each threat level ratio factor to a preset formula for calculating the score of each classified threat level, and diagnosis analysis report information capable of providing a user's response guide corresponding thereto may be configured.

Accordingly, the user terminal 200 may receive the diagnosis analysis report information, accurately confirm the email security threat status based on the security threat architecture on the basis of actual quantitative data, and receive a guide corresponding thereto and take an action to block in advance more diversified security threats such as targeted email attacks or the like.

In addition, the diagnosis reporting unit 180 may provide a warning message to the user terminal 200 on the basis of the diagnosis analysis report information. The warning message shows the user the risk of the targeted email attack using terms such as 'spam', 'look-alike domain', and 'forged header' together with the email subject of the mailbox, so that the user may identify the type of the email. In addition, the security manager may configure so that a suspicious email may be or may not be delivered to the user, and may also set and manage words/phrases of the warning message by the group.

Meanwhile, the diagnosis reporting unit 180 may configure preliminary email security report information and provide it to the user terminal 200. The preliminary email security report information may be provided as a notification before the user opens the email and may provide the risk of the received email.

This preliminary email security report information may be displayed individually or as a comprehensive threat level in correspondence to at least the following information.

Reception detail report: History of receiving email through the email address before for confirmation of look-alike domain Delivery route report: Current delivery route and history of changing delivery route of email transmission Header forgery and alteration report: Forgery and alteration status of sender header URL inspection report: Number of malicious URLs detected Look-alike domain: Risk level of look-alike domains (e.g., TLD, low, medium, high, and risky)

In addition, the diagnosis reporting unit 180 may configure post-email security report information and provide it to the user terminal 200. The post-email security report information is a detailed summary report that allows a security manager or user to recognize the email security state, and may include investigation analysis information, such as information on the current state of a risk mail, as described below.

Safety risk assessment: The number of fraudulent emails per day, the number of attacks received per user account, status of attack areas in each country, security level of current email risk Safety risk analysis: Status of email attack of each attack type (e.g., spam, malware, malicious URL and attached file, forged header, look-alike domain)

Attack scenarios (e.g., malware, malicious URL, suspicious sender address, forged header and look-alike domain, etc.)

In addition, the diagnosis reporting unit 180 may provide a state dashboard interface to the user terminal 200, and the state dashboard interface may provide an overview of the real-time technical state of inbound and outbound emails affecting operations for selected technical entities, such as operational status, configurations, and operating environments.

For example, the state dashboard interface may configure a real-time information panel of the entire targeted email attack blocking functions (e.g., total number and state of emails, reasons for inbound and outbound email failures, number of targeted email attacks received) so that the internal security managers may recognize and control.

Accordingly, the diagnosis reporting unit 180 may configure an email security diagnosis analysis report for targeted email attacks based on scores of each threat level classification, and the configured email security diagnosis analysis reporting information may be provided to the user terminal 200.

In addition, the diagnosis reporting unit 180 may confirm a comprehensive security threat level of the diagnosis target email system and individual emails by applying the quantitative analysis information of each threat level ratio factor to a preset formula for calculating the score of each classified threat level, and diagnosis analysis report information capable of providing a user's response guide corresponding thereto may be configured.

More specifically, the determination criteria for determining the comprehensive security threat level of an individual email may be determined according to the threat level element classification criteria.

Here, the classification conditions of the threat level element classification criteria may be set in correspondence to a result of detecting the risk of each targeted email attack, and may include, for example, at least one among detection of a malware mail, detection of a malware behavior, detection of a virus, detection of ransomware, detection of a malicious URL, detection of a URL in the message body, detection of a URL in an attached file, detection of header forgery and alteration, detection of a change in the address of a reply, detection of a change in the ID, detection of a change in the domain, detection of a change in the order of ID and domain, detection of a change in the originating address, detection of a look-alike domain, detection of a header forgery and alteration warning mail, detection of a spam mail (advertisement or business purpose), and detection of a reliability warning mail.

When any one of these classification conditions is met, a score may be assigned to each classification condition, and a final score may be calculated according to calculations such as summation, average, and the like of each threat level element classification criterion. Accordingly, the diagnosis reporting unit 180 may determine the score of each threat level classification of a mail to be diagnosed.

More specifically, the classification conditions may be assigned for each classified threat level, and the quantitative analysis values detected according to the classification conditions may be summed in correspondence to each classified threat level, and a score of each classified threat level may be determined according to the summed value.

For example, the threat level may be classified into a first level, a second level, a third level, and a fourth level according to the risk, and scores may be calculated and summed for each level.

Furthermore, the diagnosis reporting unit 180 may set a risk weight corresponding to each threat level. The risk weight may be assigned as such 10% for the first level, 20% for the second level, 30% for the third level, and 40% for the fourth level.

Accordingly, the diagnosis reporting unit 180 may calculate the targeted email attack security threat risk of a mail to be diagnosed by multiplying the score of each threat level by the risk weight and summing up the results.

The targeted email attack security threat risk may be mapped to a security level of A, B, C, D, or E according to a preset level, and according to the mapping, the diagnosis reporting unit may construct threat level-based guide contents indicating a comprehensive security threat risk corresponding to a specific mail and provide the threat level-based guide contents to the terminal of a mail user.

Here, the diagnosis reporting unit 180 may calculate the score in real time by reflecting the user's email history information and setting information updated in real time, on the basis of the security threat information synchronization data.

For example, when a user performs permission management setting for a specific originating country, a mail received from the originating country may be excluded from risk assessment or may be processed as a risk of 0 point.

The user's setting is reflected to diagnose the risk of a targeted email attack while a user such as a company or the like has customized the setting according to the environment of receiving and transmitting an email.

In addition, as the result of targeted email attack risk inspection of already transmitted email data is reflected through the security threat information synchronization data, the diagnosis reporting unit 180 may calculate a targeted email attack risk score for each inbound mail using the sending address, sending country, detected malware, and the like that are determined as being risky in the outbound mail.

In addition, in calculating the targeted email attack risk score, each threat level element classification criterion may be classified according to the category, and a scoring table for each classified category may be constructed in advance.

For example, the threat level element classification criterion may include categories of email protocol and advertising mail, and scores such as 1 point for advertisement-related blocking history, 1 point for warning history, 2 points for reliability blocking history, and the like may be assigned.

In addition, for example, the threat level element classification criterion may include a malware category, and scores such as 3 points for URL detection (including post-risk such as zero-day URL or the like), 2 points for malicious links in documents, 1 point for viruses, 2 points for ransomware, 3 points for behavior-based detection, and the like may be assigned.

In addition, for example, the threat level element classification criterion may include a basic phishing risk category related to social engineering attack, and scores such as 2 points for address forgery and alteration, 1 point for ID forgery and alteration, 1 point for domain forgery and alteration, 3 points for other forgery and alterations, and the like may be assigned.

In addition, for example, the threat level element classification criterion may include an intelligent phishing risk category related to social engineering attack, and scores such as 1 point for the risk of initial originating address, 2 points for the risk of final originating address, 3 points for the risk of other originating addresses, 3 points for the risk according to look-alike domain risk, 2 points for high, 1 point for middle, 1 point for low, 2 points for (top level domain) TLD, and the like may be assigned.

The diagnosis reporting unit 180 may calculate an email risk score for blocking these targeted email attacks, map a security level for the targeted email attacks, configure the mapped security level information as guide contents, and provide the guide contents to the user terminal. For example, the diagnosis reporting unit 180 may configure the guide contents as a text or image marker and insert it into email data, and the marker may be displayed at a position adjacent to the email subject or at the starting point of the email message body.

In addition, the diagnosis reporting unit 180 determines a case where the number of mails, of which a total sum of the targeted attack risk score of each item is greater than or equal to a first threshold, the targeted attack risk score of a specific item is greater than or equal to a second threshold, a period in which the total sum of the targeted attack risk score of each item is greater than or equal to a third threshold continues for more than a predetermined period of time, or the total sum of the targeted attack risk score for each item is greater than or equal to the third threshold, exceeds a predetermined number within a predetermined period of time, and when each of the conditions is determined, it may provide a warning notification to the inbound mail processing unit 150 or the outbound mail processing unit 160. The inbound mail processing unit 150 or the outbound mail processing unit 160 may process a manager notification corresponding to the warning notification mail or perform a process of automatically blocking the mail.

Accordingly, on the basis of actual quantitative data, the user terminal 200 may accurately confirm, for each mail and system, the state of a targeted email security threat calculated on the basis of the security threat information synchronization data obtained by synchronizing the targeted email security threat information configured by performing a targeted email security threat inspection on an inbound mail with the targeted email security threat information configured by performing a targeted email security threat inspection on an outbound mail, and may receive a guide corresponding the state and take an action to block in advance more diversified security threats of the targeted email attacks or the like.

Figure 5:
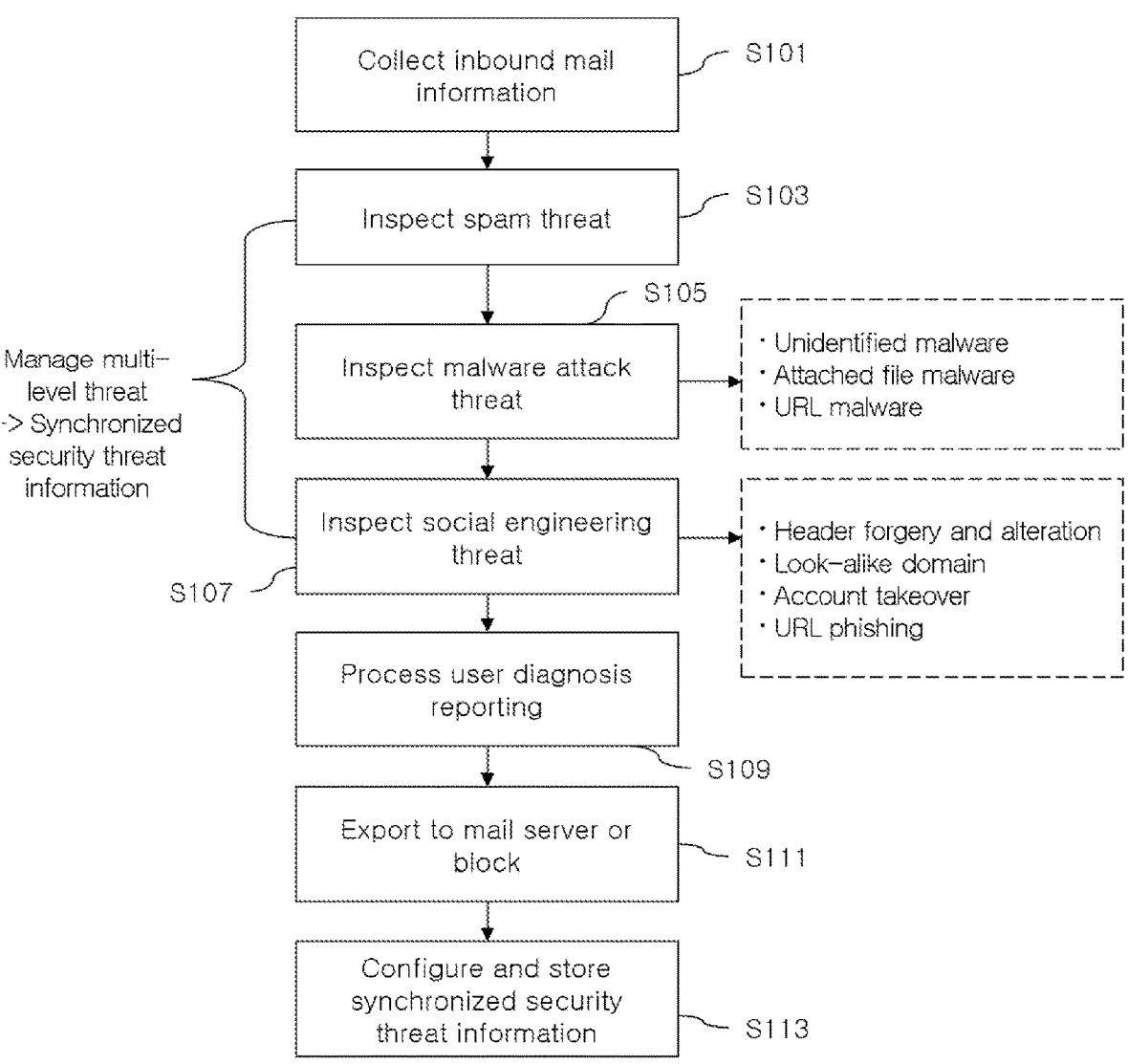
FIGS. 5 and 6 are flowcharts illustrating a service process using a system according to an embodiment of the present invention.
Figure 6:
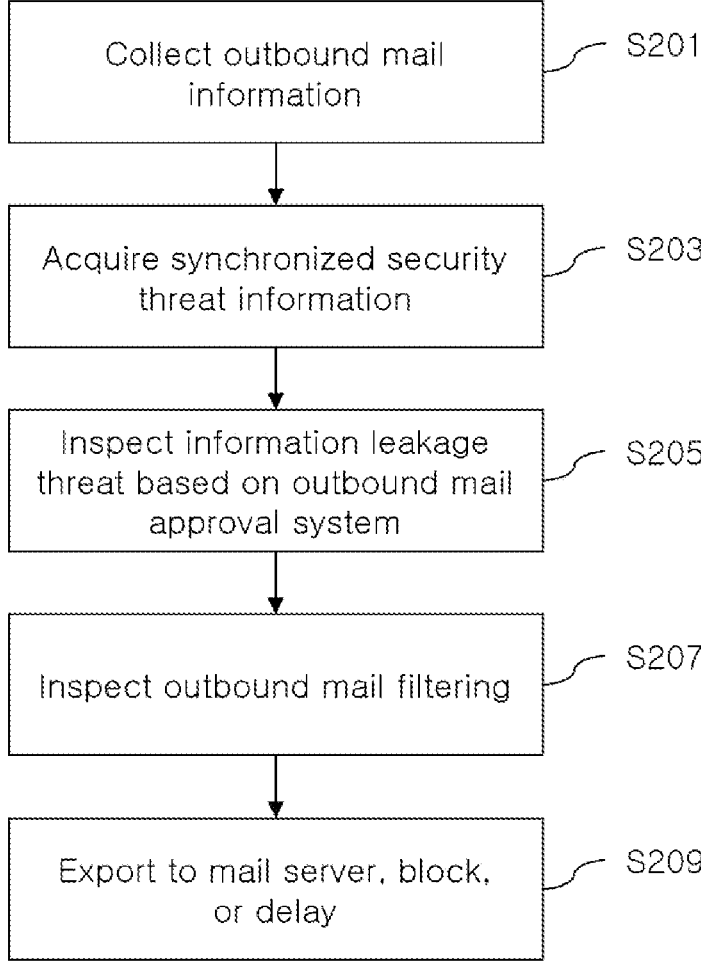

FIGS. 5 and 6 are flowcharts illustrating a service process using a system according to an embodiment of the present invention.

Referring to FIGS. 5 and 6, first, FIG. 5 relates to a targeted email attack threat inspection process of an inbound mail, and the service providing device 100 collects information on inbound mails (S101).

Then, the service providing device 100 may perform a targeted email security threat inspection corresponding to a new inbound mail using the security threat information synchronization data, and the targeted email security threat inspection may include multi-level inspection at each stage, such as spam threat inspection (S103), malware attack threat inspection (S105), and social engineering threat inspection (S107).

Here, the malware attack threat inspection may include a targeted email attack threat inspection on unidentified malware, attached file malware, URL malware, and the like, and the social engineering threat inspection may include header forgery and alteration inspection, look-alike domain inspection, account takeover inspection, and URL phishing inspection.

Thereafter, according to a result of the inspection, the service providing device 100 may perform user diagnosis reporting (S109) and determine whether to export the mail to the mail server or to block the mail based on the inspection result (S111).

Furthermore, the service providing device 100 may configure a warning notification message corresponding to export, blocking, or delay, and provide the message to the manager's user terminal 200 or the receiver terminal 20.

In addition, each inspection result may be configured as the security threat information synchronization data configured by synchronizing the targeted email security threat information configured by performing a targeted email security threat inspection on an inbound mail with the targeted email security threat information configured by performing a targeted email security threat inspection on an outbound mail.

Meanwhile, FIG. 6 relates to a targeted email attack threat inspection process of an outbound mail, and the service providing device 100 collects information outbound mails (S201).

Thereafter, the service providing device 100 acquires, as each inspection result, security threat information synchronized until now from the security threat information synchronization data obtained by synchronizing the targeted email security threat information configured by performing a targeted email security threat inspection on an inbound mail with the targeted email security threat information configured by performing a targeted email security threat inspection on an outbound mail (S203).

Then, the service providing device 100 performs an information leakage threat inspection based on a transmission approval system using the synchronized security threat information (S205).

Thereafter, the service providing device 100 performs a filtering inspection process on the outbound mail using the synchronized security threat information.

Then, the service providing device 100 determines whether to export the mail to the mail server or to block or delay the mail using the inspection result of the outbound mail (S209).

Furthermore, the service providing device 100 may configure a warning notification message corresponding to export, blocking, or delay, and provide the message to the manager's user terminal 200 or the sender terminal 10.

Figure 7:
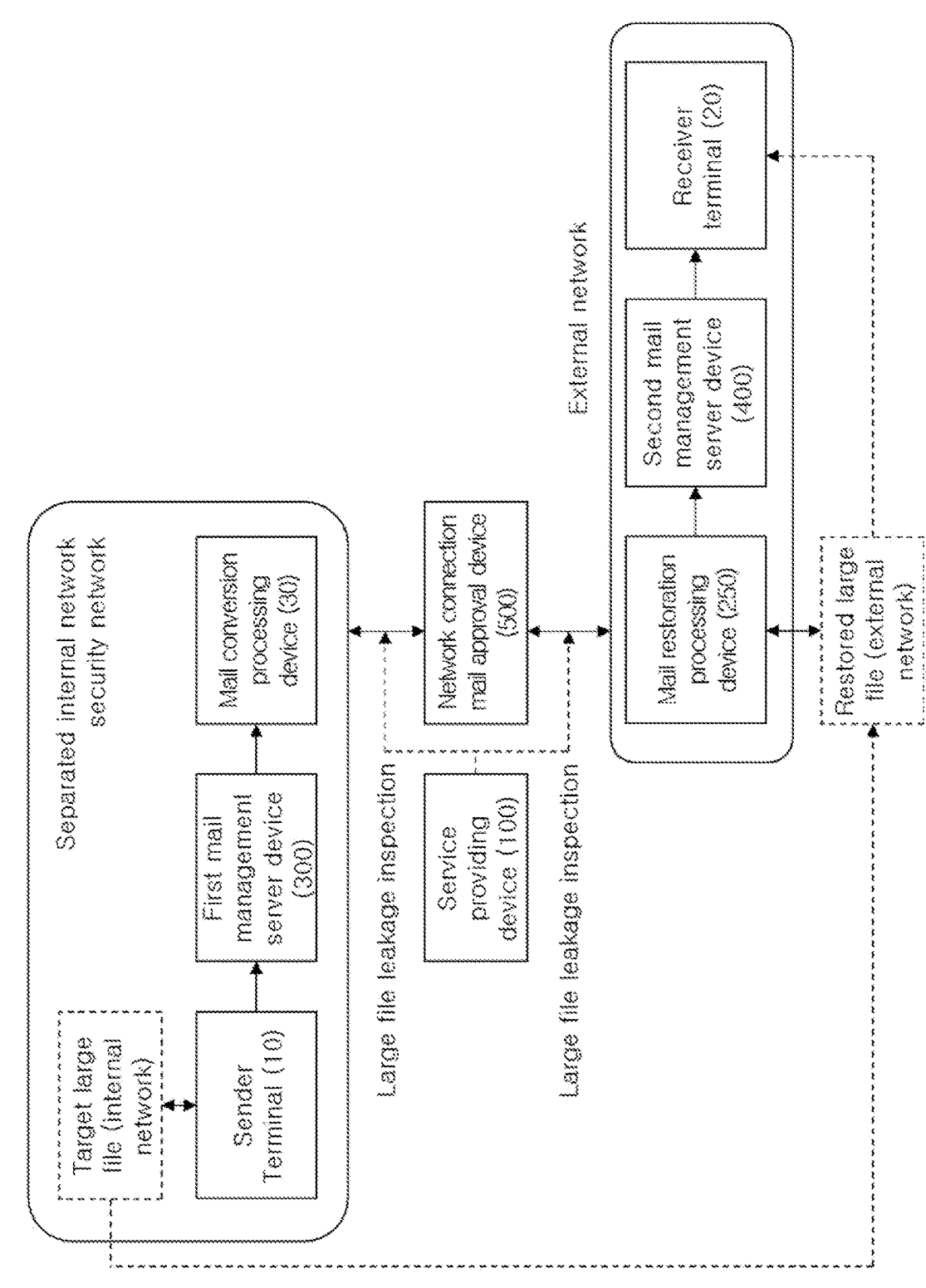
FIG. 7 is a view for explaining a large file leakage inspection process according to an embodiment of the present invention.

FIG. 7 is a view for explaining a large file leakage inspection process according to an embodiment of the present invention.

Referring to FIG. 7, the system according to an embodiment of the present invention includes a sender terminal 10, a first mail management server device 300, a mail conversion processing device 30, a service providing device 100, a network connection mail approval device 500, a mail restoration processing device 250, a second mail management server device 400, and a receiver terminal 20.

More specifically, the sender terminal 10, the first mail management server device 300, and the mail conversion processing device 30 may configure a secure network separated as an internal network. The security network of a separate network is a network that may transmit mail to an external network only through the network connection mail approval device 500, and secured internal networks and security devices based on various network interface environments for this purpose may be constructed.

To this end, the network connection mail approval device 500 may receive a request for approving email data to be transmitted to the external network from the first mail management server device 300 that constructs a mail server in the internal network, process leakage inspection for blocking targeted email attacks through the service providing device 100 only on the mails that have been approved and security-verified by comparing the request with preset approval policies, and export the mail to the second mail management server device 400 or the like through the external network.

Here, the preset approval policies may include confirming manager's authentication information, confirming approval of a senior member in the organization corresponding to the sender, inspecting whether email data is vulnerable to security, or the like, and the approval is confirmed by applying various policies in combination.

On the contrary, when an external mail of an external user is received on the internal network through the second mail management server device 400 of the external network, the network connection mail approval device 500 may perform, through the service providing device 100, a process of performing a security inspection on the attached files and URLs of the external mail and importing only verified mails into the internal network.

Unlike the operation of an internal network system and the network connection mail approval device 500, the mail restoration processing device 250, the second mail management server device 400, and the receiver terminal 20 located in the external network are connected in one or more of wired and wireless methods through connection to a public network to transmit and receive data. The public network is a communication network constructed and managed by the country or a telecommunication infrastructure operator, and generally includes a telephone network, a data network, a CATV network, a mobile communication network, and the like to provide connection services so that unspecified many people may access other communication networks or the Internet.

Meanwhile, the sender terminal 10, the first mail management server device 300, the mail conversion processing device 30, and the network connection mail approval device 500 may include a communication module for communicating using a first protocol corresponding to the internal network.

In addition, the network connection mail approval device 500, the mail restoration processing device 250, the second mail management server device 400, and the receiver terminal 20 may include a communication module for communicating using a second protocol corresponding to the external network.

In this way, each security network separating the internal network may be connected to each of the devices constituting the external network through a wired/wireless network, and devices or terminals connected to each network may communicate with each other through a secured network channel.

Here, each of the networks may be implemented as various types of wired/wireless networks, such as a local area network (LAN), a wide area network (WAN), a value-added network (VAN), a personal area network (PAN), a mobile communication network, and a satellite communication network.

In addition, although the sender terminal 10 and the receiver terminal 20 may include a personal computer (PC), a laptop computer, a mobile phone, a tablet PC, a Personal Digital Assistant (PDA), a Portable Multimedia Player (PMP), and the like, the present invention is not limited thereto, and various devices connectable to the first mail management server device 300 or the second mail management server device 400 through an internal network, a public network, or a private network may be exemplified. In addition, each of the sender terminal 10 and the receiver terminal 20 may be a variety of devices capable of inputting and outputting information through application driving or web browsing.

The first mail management server device 300 or the second mail management server device 400 include a system that relays and stores electronic mail contents so as to send a mail written by a user or receive a mail written by a counterpart, and may perform communication between the devices using a mail protocol set in advance according to the purpose of receiving and sending mails.

Generally, Post Office Protocol 3 (POP3) and Internet Message Access Protocol (IMAP) may be used as the mail protocol when a mail is received. In addition, the Simple Mail Transfer Protocol (SMTP) or Electronic Mail (EML) protocol may be used as the protocol when a mail is transmitted. In this way, the first mail management server device 300 and the second mail management server device 400 may be configured to operate as a server system for processing transmission and reception of mail with in each separated network.

In the system configuration like this, the mail conversion processing device 30 according to an embodiment of the present invention may be located in an internal network of a secure network separate from an external network, and may process a function of converting an email including link information of a large file located in the internal network, performing a leak inspection for blocking targeted email attacks through the service providing device 100, acquiring approval from the network connection mail approval device 500, and delivering the email to the mail restoration processing device 250 of the external network.

To this end, first, the mail conversion processing device 30 may acquire the transmission mail requested to be transmitted from the sender terminal 10 located in the internal network through the first mail management server device 300, identify link information of a large file located in the internal network from the transmitted mail, and acquire the large file located in the internal network on the basis of the link information.

Then, the mail conversion processing device 30 may generate a converted mail in which the large file is inserted to be classified as a general attached file of the transmission mail, and the converted mail may be transmitted to the mail restoration processing device 250 located in the external network via the network connection mail approval device 500.

In this case, the network connection mail approval device 500 may inspect the security risk of the large file inserted to be classified as a general attached file according to preset mail transmission policies, and approve transmission of the converted email after performing a leak inspection for blocking targeted email attacks through the service providing device 100, and the converted mail that has been approved may be received by the mail restoration processing device 250 according to an embodiment of the present invention before being delivered to the second mail management server device 400.

The mail restoration processing device 250 may be located in an external network separate from the internal network of the security network, and when the mail restoration processing device 250 receives the converted mail that has been converted and transmitted from the internal network, it may perform a leakage inspection for blocking targeted email attacks through the service providing device 100, and then perform a restoration and forwarding process of constructing a restored mail in which the large file of the internal network is restored from the converted mail, and delivering the restored mail to the receiver terminal 20 via the second mail management server device 400.

More specifically, the mail restoration processing device 250 may acquire a large file of the internal network from the general attached file data included in the converted mail, separate the large file of the internal network from the converted mail, and upload the separated large file to an arbitrary encrypted external network path.

Then, the mail restoration processing device 250 configures a restored mail of the converted mail by including the uploaded external network path information in the converted mail from which the large file is separated, and the restored mail may be delivered to the second mail management server device 400 and processed to be transmitted to the receiver terminal.

According to the system configuration as described above, large files of the internal network that have not been able to be exported to the external network may be processed to be exported through the secured email system, and owing to this process, a mail service that allows mail receivers of the external network to easily confirm large files of the internal network can be implemented while utilizing the mail system security system as is.

For example, since when a user of the sender terminal 10 of the internal network simply inputs a file, which is to be exported through a mail, as a large file attachment to a general email, the receiver terminal 20 may acquire the large file restored and uploaded in the same way as the large file attachment of the outbound mail from the external network path information included in the inbound mail, export of large files may be processed practically.

In addition, since access rights and access information for the large files of the external network can be managed by the mail restoration processing device 250, the vulnerable security environment that has inevitably used cloud sharing service or the like can be complemented, and internal network files may be transmitted to the external network more conveniently and safely via a mail.

Figure 8:
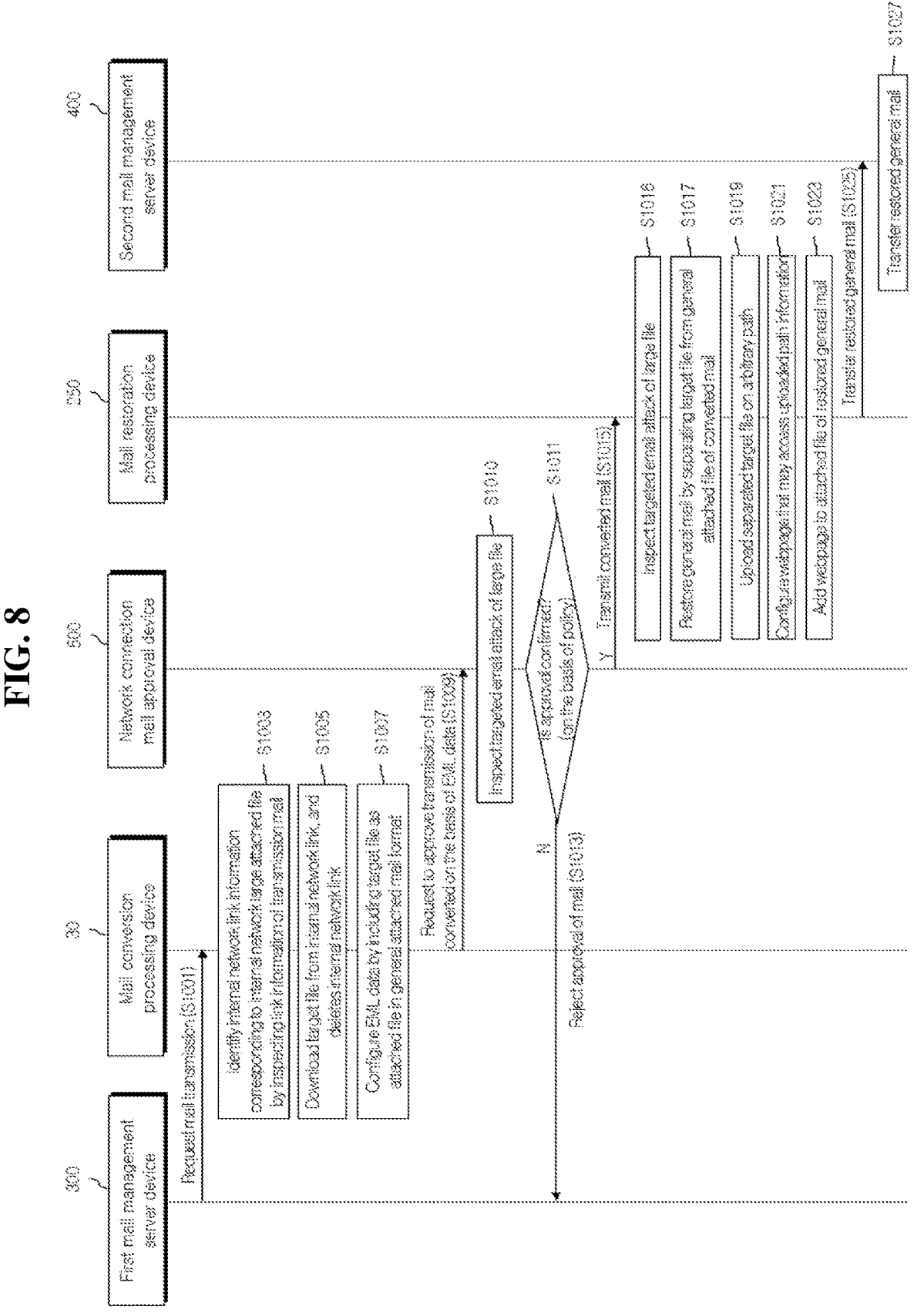
FIG. 8 is a ladder diagram for explaining a policy-based approval process for a large file according to an embodiment of the present invention.

FIG. 8 is a ladder diagram for explaining a policy-based approval process for a large file according to an embodiment of the present invention.

Referring to FIG. 8, first, the first mail management server device 300 receives a mail transmission request from the sender terminal 10 and transmits it to the mail conversion processing device 30 (S1001).

Thereafter, the mail conversion processing device 30 identifies internal network link information corresponding to a large attached file of the internal network from the transmission requested mail (S1003).

In order to identify the internal network link information, the mail conversion processing device 30 according to an embodiment of the present invention first extracts link information (URL or URI) included in the transmission requested mail through an internal network link identification unit 110 and perform tracking inspection on the link information.

More specifically, the mail conversion processing device 30 may extract all link information included in the transmission requested mail or link information designated as a preset internal network path (e.g., link information of which the IP address starts with a private IP address set to the internal network) through the internal network link identification unit 110, access the extracted link information, and examine whether the file may be downloaded and the file size.

Accordingly, the internal network link identification unit 110 of the mail conversion processing device 30 identifies the size information of the file to be downloaded from the link information examined as being capable of downloading the file, and when the size information is greater than a predetermined size, it may be identified as link information corresponding to a large attached file of the internal network.

For example, the predetermined size may be 2 megabytes, and the internal network link identification unit 110 may extract link information for downloading an internal network file exceeding 2 megabytes from all link information or designated link information, and identify as internal network link information corresponding to a large attached file of the internal network.

Then, the mail conversion processing device 30 downloads the target file from the internal network link and deletes the link to the large file of the internal network from the transmission mail (S1005).

Thereafter, the mail conversion processing device 30 configures EML data by including the target file in the transmission mail, from which the link to the large file is deleted, as an attached file in a general attached mail format (S1007).

Then, the mail conversion processing device 30 requests the network connection mail approval device 500 to approve transmission of a mail converted on the basis of the EML data (S1009).

The network connection mail approval device 500 may inspect a targeted email attack of the large file using the service providing device 100 (S1010), determine whether or not to approve the mail on the basis of preset policies (S1011), transfer a rejection message to the sender terminal 10 through the first mail management server device 300 when the approval is rejected (S1013), and transmits the converted mail to the mail restoration processing device 250 connected to the second mail management server device 400 of the external network when the approval is confirmed (S1015).

Thereafter, the mail restoration processing device 250 separates the target file from the general attached file of the converted mail, performs a process of inspecting a targeted email attack of the large file using the service providing device 100 (S1016), and restores the target file as a general mail (S1017).

Then, the mail restoration processing device 250 uploads the separated target file on an arbitrary path (S1019) and configures a webpage that may access the uploaded path information (S1021).

Thereafter, the mail restoration processing device 250 adds the webpage to the attached file of the restored general mail (S1023), and transfers the restored general mail to the receiver terminal 20 through the second mail management server device 400 (S1025, S1027).

Although the upload path information is illustrated as being added as a webpage in an embodiment of the present invention, the present invention is not limited thereto, and the upload path information may be attached to the restored general mail in various ways, such as link information, URL text, and the like.

Meanwhile, as a general security requirement to respond to the targeted email attacks, synchronization between inbound and outbound inspection of collected malicious files and account data is required. The folder structure of an email security system should be periodically changed either manually or automatically, and malware is inspected in addition to the whitelist. In addition, malicious account takeover attempts targeting users, security managers, and the web are monitored.

In addition, as a security requirement for an email security reporting system, a report for confirming whether an inbound email is safe should be provided to the user before opening the email, and a diagnosis report should be provided on the basis of data collected about the email security status of the domain or server. In addition, risk results calculated for all inbound emails should be provided, and the results should be displayed together with the emails. Information on blocked fraudulent emails is regularly provided to the security manager and the user, and when an email with a security problem is delivered, a warning message is provided to the user, together with the email subject. Meanwhile, emails detected as false positives in the security inspection process can be retrieved.

In addition, as a general countermeasure against the targeted email attacks, monitoring of email whitelist/blacklist registration, email security data synchronization, and login log is performed. Through the email whitelist/blacklist registration, the security manager may manually input specific email addresses, IP addresses, and domains that are allowed and disallowed. Accordingly, user access is automatically filtered by approving or deleting emails. Meanwhile, in order to block inflow of malware from the inbound and outbound emails, additional inspection should be performed on the email accounts or IP addresses registered in the whitelist. The email security data synchronization is used to synchronize and block inbound and outbound data by collecting and analyzing new and existing data from inbound and outbound emails. Detailed information on the email security data includes zero-day malware, look-alike domains, and delivery path information (e.g., email server and sender location). In addition, the login log monitors attempts of malicious account takeover within the email server by displaying users, security managers, and login attempts for the web, together with detailed log information such as ID, location (country), IP address, date, and status (e.g., success or failure).

In addition, as a countermeasure related to the email security reporting system, warning messages, email risk score determination criteria, email security reports for users, and a status board are provided. The warning message warns users about the risk of targeted email attacks using the terms such as 'look-alike domain' and 'forged header' together with the subject of the email in the mailbox so that the users may recognize the type of malicious email that they have received. In addition, the security manager may be configured to deliver or not to deliver suspicious emails, and warning words/phrases in the message may be set and managed by group. The email risk score determination criteria provide criteria that allow users to easily and intuitively determine or recognize the risk of an email, and may be divided into methods for calculating email risk scores and implementation conditions. The email security report (for users) is displayed as a notification before the user opens the email to indicate the risk of the received email. To this end, records previously received from email addresses confirmed as a look-alike domain (received history), changes in the current delivery route and delivery route history of email transmission (delivery route), status of sender header forgery, number of malicious URLs detected (URL inspection), and risk levels of look-alike domains (e.g., TLD, low, high, and risky) are displayed in the email security report. The status board provides an overview of the real-time technical status of inbound and outbound emails that affect the operation on selected technical objects, such as the operation status, configuration, and operating environment. Here, fully functioning panels for real-time information such as the total number and status of emails, reasons for failure of inbound and outbound emails, the number of targeted email attacks received, and the like are shown to be controlled by the manager to recognize the risk and disruption of email security.

The methods according to the present invention described above may be manufactured as a program to be executed on a computer and stored in a computer-readable recording medium, and examples of the computer-readable recording medium include ROM, RAM, CD-ROM, magnetic tapes, floppy disks, optical data storage devices and the like.

The computer-readable recording medium may be distributed in computer systems connected through a network, so that computer-readable codes may be stored and executed in a distributed manner. In addition, functional programs, codes, and code segments for implementing the method may be easily inferred by the programmers in the art to which the present invention belongs.

In addition, although preferred embodiments of the present invention have been illustrated and described above, the present invention is not limited to the specific embodiments described above, and various modified embodiments can be made by those skilled in the art without departing from the gist of the invention claimed in the claims, and in addition, these modified embodiments should not be individually understood from the spirit or perspective of the present invention.

The invention claimed is:

1. An operation method of a service providing device using an email security system, the method comprising:

configuring security threat information synchronization data by synchronizing first targeted email security threat information configured by performing a first targeted email security threat inspection on an inbound email with second targeted email security threat information configured by performing a second targeted email security threat inspection on an outbound email, wherein the first targeted email security threat information and the second targeted security threat information are based on prior inspection results of one or more emails received at a user terminal via the service providing device;

performing a targeted email security threat inspection, at the service providing device, corresponding to a new inbound email received at the user terminal or a new outbound email transmitted at the user terminal using the security threat information synchronization data; and performing a targeted email security threat response process according to the targeted email security threat inspection of the new inbound email or the new outbound email, wherein the targeted email security threat inspection includes an unauthorized email server access attack threat inspection corresponding to email information leakage threat inspection items, wherein based on the unauthorized email server access attack threat inspection, access to webmail service of unregistered Simple Mail Transfer Protocol (SMTP) is blocked, and wherein when a sender's SMTP information does not match a receiver's SMTP information, email delivery is blocked.

2. The method according to claim 1, wherein access to unregistered client server protocols/mail transfer protocols and countries is blocked while accessing a webmail and a mail client.

3. The method according to claim 2, wherein only access to registered client server protocols/mail transfer protocols and countries is allowed.

4. The method according to claim 1, wherein the unauthorized email server access attack threat inspection grasps detailed information about access in order to determine an unauthorized email server attack.

5. The method according to claim 1, wherein through email server/IP access control, a security manager controls secure email links by restricting access to a webmail or a mail client.

6. The method according to claim 1, wherein whether or not to approve access of a user is determined using email server access log.

7. A service providing device using an email security system, the device comprising:

security threat information synchronization processing circuitry for configuring security threat information synchronization data by synchronizing first targeted email security threat information configured by performing a first targeted email security threat inspection on an inbound email with second targeted email security threat information configured by performing a second targeted email security threat inspection on an outbound email, wherein the first targeted email security threat information and the second targeted security threat information are based on prior inspection results of one or more emails received at a user terminal via the service providing device;

targeted email security threat inspection circuitry for performing a targeted email security threat inspection, at the service providing device, corresponding to a new inbound email received at the user terminal or a new outbound email transmitted from the user terminal using the security threat information synchronization data; and mail processing circuitry for performing a targeted email security threat response process according to the targeted email security threat inspection of the new inbound email or the new outbound email, wherein the targeted email security threat inspection circuitry performs an unauthorized email server access attack threat inspection corresponding to email information leakage threat inspection items, wherein based on the unauthorized email server access attack threat inspection, access to webmail service of unregistered Simple Mail Transfer Protocol (SMTP) is blocked, and wherein when a sender's SMTP information does not match a receiver's SMTP information, email delivery is blocked.

8. The device according to claim 7, wherein the mail processing circuitry blocks access to unregistered client server protocols/mail transfer protocols and countries while accessing a webmail and a mail client.

9. The device according to claim 7, wherein the targeted email security threat inspection circuitry grasps detailed information about access in order to determine an unauthorized email server attack.

10. The device according to claim 7, wherein the mail processing circuitry allows a security manager to control secure email links by restricting access to a webmail or a mail client through email server/IP access control.

11. The device according to claim 7, wherein the mail processing circuitry determines whether or not to approve access of a user using email server access log.

* * * * *